(12) United States Patent
Murashige et al.

(10) Patent No.: US 10,374,467 B2
(45) Date of Patent: Aug. 6, 2019

(54) COIL UNIT, WIRELESS POWER FEEDING DEVICE, WIRELESS POWER RECEIVING DEVICE AND WIRELESS POWER TRANSMISSION DEVICE

(71) Applicant: TDK CORPORATION, Tokyo (JP)

(72) Inventors: Takuya Murashige, Tokyo (JP); Masahide Ohnishi, Tokyo (JP); Masayuki Sugasawa, Tokyo (JP); Masayuki Kobayashi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 134 days.

(21) Appl. No.: 15/472,739

(22) Filed: Mar. 29, 2017

(65) Prior Publication Data

US 2017/0288469 A1  Oct. 5, 2017

(30) Foreign Application Priority Data

Mar. 30, 2016  (JP) .................................. 2016-067815
Feb. 14, 2017  (JP) .................................. 2017-025161

(51) Int. Cl.
| | |
|---|---|
| *H02J 50/60* | (2016.01) |
| *H02J 50/10* | (2016.01) |
| *H01F 27/02* | (2006.01) |
| *H01F 27/28* | (2006.01) |
| *H01F 38/14* | (2006.01) |
| *H02J 7/02* | (2016.01) |
| *H02J 50/70* | (2016.01) |

(Continued)

(52) U.S. Cl.
CPC .............. *H02J 50/60* (2016.02); *B60L 53/12* (2019.02); *H01F 27/02* (2013.01); *H01F 27/2823* (2013.01); *H01F 38/14* (2013.01); *H02J 7/025* (2013.01); *H02J 50/10* (2016.02); *H02J 50/70* (2016.02); *H01F 27/365* (2013.01)

(58) Field of Classification Search
CPC . H02J 50/60; H02J 50/70; H02J 7/025; B60L 11/182; H01F 27/02; H01F 27/365; H01F 27/2823

See application file for complete search history.

(56) References Cited

U.S. PATENT DOCUMENTS

| | | | |
|---|---|---|---|
| 9,379,780 B2 | 6/2016 | Widmer | |
| 9,543,065 B2 | 1/2017 | Kurihara et al. | |

(Continued)

FOREIGN PATENT DOCUMENTS

| | | |
|---|---|---|
| CN | 103098344 A | 5/2013 |
| CN | 205725064 U | 11/2016 |

(Continued)

*Primary Examiner* — Alfonso Perez Borroto
*Assistant Examiner* — Esayas G Yeshaw
(74) *Attorney, Agent, or Firm* — Oliff PLC

(57) ABSTRACT

A coil unit provided on a ground side, including a coil, at least one sensor for detecting an object existing above or around the coil unit, a housing for accommodating the coil and the at least one sensor, wherein, the housing is provided with a dividing plate and at least one pillar for maintaining the internal space of the space for sensor, the dividing plate divides the space into a space for coil and a space for sensor located vertically above the space for coil, the space for coil is for accommodating the coil and the space for sensor is for accommodating the at least one sensor, and the at least one sensor is disposed on the dividing plate without contacting with an upper inner surface portion of the housing in the space for sensor.

14 Claims, 15 Drawing Sheets

(51) Int. Cl.
*B60L 53/12* (2019.01)
*H01F 27/36* (2006.01)

(56) References Cited

U.S. PATENT DOCUMENTS

| | | |
|---|---|---|
| 9,973,043 B2 | 5/2018 | Koizumi et al. |
| 2012/0153894 A1 | 6/2012 | Widmer |
| 2013/0169062 A1 | 7/2013 | Maikawa et al. |
| 2015/0332826 A1 | 11/2015 | Kurihara et al. |
| 2016/0134162 A1 | 5/2016 | Koizumi et al. |
| 2016/0143194 A1 | 5/2016 | Yanagida |

FOREIGN PATENT DOCUMENTS

| | | |
|---|---|---|
| JP | 2012-089618 A | 5/2012 |
| JP | 2012-222956 A | 11/2012 |
| JP | 2014-507103 A | 3/2014 |
| JP | 2014-075899 A | 4/2014 |
| JP | 2015-012764 A | 1/2015 |
| JP | 2015-019508 A | 1/2015 |
| WO | 2014/119285 A1 | 8/2014 |

COIL UNIT, WIRELESS POWER FEEDING DEVICE, WIRELESS POWER RECEIVING DEVICE AND WIRELESS POWER TRANSMISSION DEVICE

The present invention relates to a coil unit, a wireless power feeding device, a wireless power receiving device and a wireless power transmission device.

BACKGROUND

A wireless type electric power supply system has been proposed which charges a battery equipped in a vehicle when a vehicle is parked in a parking space by supplying electric power from a power feeding coil unit installed on a parking space, where a vehicle can be parked, to a power receiving coil unit provided on the vehicle side via a magnetic field.

In this wireless type electric power supply system, in order to detect that any foreign metals which may be affected by a magnetic field are mixed between the power feeding coil unit and the power receiving coil unit, the development of a power feeding coil unit equipped with a sensor has been under review.

However, since the power feeding coil unit is installed on the road surface of the parking space, there is a problem that an external stress is easily to be applied to built-in portions when a vehicle runs on the power feeding coil unit, and thus, studies for improving the load bearing performance of the power feeding coil unit are becoming active.

PATENT DOCUMENTS

Patent Document 1: JP2014-75899A

SUMMARY

However, in Patent Document 1, a contactless power feeding device is proposed in which a cover of a protective housing of the power feeding portion is made into a laminated structure formed by a plurality of resin plates and can fulfill the conditions for environment, the conditions for the electric property and the conditions for the load bearing performance by using a generic synthetic resins. In the contactless power feeding device, the coil for detecting metal is interposed between an upper layer resin plate and a lower layer resin plate of a cover body for accommodating the power feeding coil body via a film adhesive material made of a soft synthetic resin material.

However, according to the technique disclosed in Patent Document 1, external stress such as shock or load applied when the vehicle runs on is dispersed by the cover with a laminated structure made of resin, but there is a problem that the dispersed external stress will still be transmitted to the portions inside the housing. Especially, for the coil for detecting metal installed on the outer surface side of the power feeding portion, the problem mentioned above would come out seriously.

Herein, the present invention is completed in view of the above problems, and its aim is to ensure the load bearing performance of the coil unit while suppressing the transmission of a stress to a sensor installed inside a coil unit when an external stress is applied.

The coil unit according to an embodiment of the present invention is a coil unit provided on the ground side, comprising a coil, at least one sensor for detecting an object existing above or around the coil unit, a housing for accommodating the coil and the at least one sensor, wherein, the housing is provided with a dividing plate and at least one pillar for maintaining the internal space of a space for sensor, the dividing plate divides the space into a space for coil and the space for sensor located vertically above the space for coil, the space for coil is for accommodating coil and the space for sensor is for accommodating the at least one sensor, and the at least one sensor is disposed on the dividing plate without contacting with the upper inner surface portion of the housing in the space for sensor.

According to the embodiment of the present invention, the housing is provided with a dividing plate for dividing the space into the space for coil and the space for sensor located vertically above the space for coil and at least one pillar for maintaining the internal space of the space for sensor, wherein, the space for coil is for accommodating coil and the space for sensor is for accommodating the at least one sensor, and the at least one sensor is disposed on the dividing plate without contacting with the upper inner surface portion of the housing in the space for sensor. Therefore, the space for sensor becomes a structure supported by the pillar, thus, the load bearing performance of the coil unit can be ensured. Further, as a gap can be ensured between the inner surface portion of the housing, on the side where the vehicle runs on, and the sensor, an external stress such as shock or load applied when the vehicle runs on can be prevented from directly transmitting to the sensor. Thereby, the load bearing performance of the coil unit can be ensured while the transmission of a stress to a sensor installed inside a coil unit when an external stress is applied can be suppressed.

In the coil unit according to the embodiment of the present invention, the at least one sensor may be a coil for detecting metal. Thereby, damage of the sensor inside the coil unit can be prevented and a foreign metal above or around the coil unit can be detected.

It is preferred that the at least one sensor has a hole penetrating in a vertical direction and the at least one pillar can pass through the hole of the at least one sensor to extend vertically. In this case, the load applied to the housing surrounding the sensor can be supported by the pillar, and the internal space around the sensor of the sensor space can be maintained.

It is preferred that the at least one sensor comprises a plurality of sensors. In this case, the detectable area of substances by using the sensors can be broadened.

It is preferred that the at least one pillar comprises a plurality of pillars. In this case, as the load applied to the housing is supported by a plurality of places, external stress can be dispersed.

It is preferred that the housing can have a projecting part extending vertically downward from the dividing plate in the space for coil. In this case, the load bearing performance can be improved against the external stress applied to the housing.

More preferably, the projecting part has a shape of a hollow tubular. In this case, small components such as electronic components can be installed in the hollow and thus the space can be effectively utilized.

Preferably, the coil can be wound with the inner peripheral edge in contact with the projecting part. In this case, since the projecting part is in contact with the coil, the heat dissipation area is increased, and the heat generated from the coil is efficiently released to the exterior through the housing. Therefore, the heat dissipation of the coil unit can be improved.

In the coil unit according to the embodiment of the present invention, the coil may be a coil where the feeding and receiving of an alternating current power is performed through a magnetic field. Thereby, damage of the sensor inside the coil unit can be prevented and the feeding and receiving of the electric power can be realized.

A wireless power feeding device according to another embodiment of the present invention is a wireless power feeding device provided on the ground side, and includes a coil unit mentioned above. According to the embodiment of the present invention, it is possible to obtain a wireless power feeding device in which the load bearing performance of the coil unit can be ensured while the transmission of a stress to a sensor installed inside the coil unit when an external stress is applied is suppressed.

A wireless power receiving device according to another embodiment of the present invention is a wireless power receiving device provided on the ground side, and includes the coil unit mentioned above. According to the embodiment of the present invention, it is possible to obtain a wireless power receiving device in which the load bearing performance of the coil unit can be ensured while the transmission of a stress to a sensor installed inside the coil unit when an external stress is applied is suppressed.

A wireless power transmission device according to another embodiment of the present invention includes a wireless power feeding device provided on the ground side and a wireless power receiving device mounted in the vehicle, and the wireless power feeding device is the wireless power feeding device mentioned above. According to the embodiment of the present invention, it is possible to obtain a wireless power transmission device in which the load bearing performance of the coil unit can be ensured while the transmission of a stress to a sensor installed inside the coil unit when an external stress is applied is suppressed.

A wireless power transmission device according to another embodiment of the present invention includes a wireless power feeding device mounted in the vehicle and a wireless power receiving device provided on the ground side, and the wireless power receiving device is the wireless power receiving device mentioned above. According to the embodiment of the present invention, it is possible to obtain a wireless power transmission device in which the load bearing performance of the coil unit can be ensured while the transmission of a stress to a sensor installed inside the coil unit when an external stress is applied is suppressed.

A wireless power transmission device according to another embodiment of the present invention includes a power supply device on a vehicle side mounted on the vehicle and a power supply on a ground side performing the feeding and receiving of the electric power wirelessly between the power supply device on the vehicle side and itself. And the power supply on the ground side includes a coil unit. According to the embodiment of the present invention, it is possible to obtain a bidirectional wireless power transmission device in which the load bearing performance of the coil unit can be ensured while the transmission of a stress to a sensor installed inside the coil unit when an external stress is applied is suppressed.

According to some embodiments of the present invention, it is possible to ensure the load bearing performance of the coil unit while the transmission of a stress to a sensor installed inside the coil unit when an external stress is applied can be suppressed.

DETAILED DESCRIPTION OF EMBODIMENTS

Figure 1:
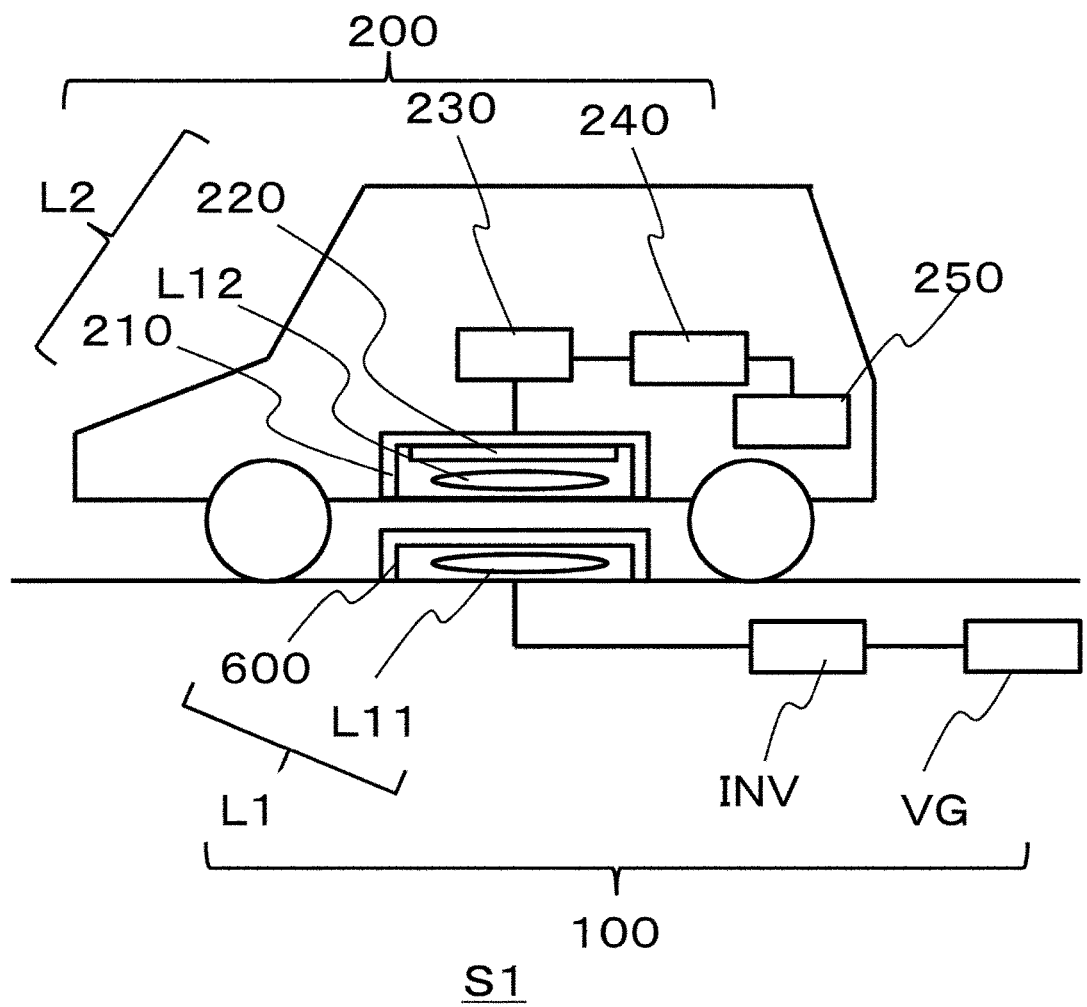
FIG. 1 is a schematic view showing the wireless power transmission device according to the first embodiment of the present invention together with the electricity storage device.

Embodiments for executing the present invention will be described in detail with reference to the drawings. In the description, the same symbols or reference numerals will be attached to the same elements or the elements having the same functions, and repeated description will be omitted. Further, the positional relationships such as upside, downside, left, and right are relative positional relationship and are not particularly limited in which the upside, downside, left, and right may be reversed. In the following description, description will be made based on the upside, downside, left and right of the drawing. Further, the size ratio in the drawings is not limited to the illustrated ratio. In addition, the following embodiments are examples for explaining the present invention, and the present invention is not limited to only those embodiments. In addition, the constituent elements described below can be appropriately combined.

First Embodiment

A wireless power transmission device S1 according to a first embodiment of the present invention will be described with reference to FIG. 1. FIG. 1 is a schematic view showing the wireless power transmission device according to the first embodiment of the present invention together with the electricity storage device.

As shown in FIG. 1, wireless power transmission device S1 includes wireless power feeding device 100 and wireless power receiving device 200. In the present embodiment, an example will be described in which wireless power transmission device S1 is applied to a power feeding facility in a vehicle. That is, wireless power feeding device 100 is a power feeding facility installed on the ground, and wireless power receiving apparatus 200 is a power receiving facility mounted in the vehicle. As examples of the vehicle to which wireless power receiving device 200 is applied, various vehicles such as an electric vehicle or a hybrid vehicle using electric power of a secondary battery can be listed.

Wireless power feeding device 100 is provided with power supply VG, inverter INV, and power feeding coil unit L1. Power supply VG supplies a direct current electric power to inverter INV which will be described later. There is no particular restriction on power supply VG as long as it outputs a direct current electric power, and it is possible to use a direct current power supply obtained by rectifying and smoothing a commercial alternating current power supply, a secondary battery, a solar photovoltaic direct current power supply, or a switching power supply device such as a switching converter or the like.

Inverter INV has a function of converting an input direct current power supplied from power supply VG into an alternating current power. Inverter INV is constituted by a switching circuit in which a plurality of switching elements are bridge-connected. As the switching elements constituting the switching circuit, for example, elements such as MOS-FET (Metal Oxide Semiconductor-Field Effect Transistor) or IGBT (Insulated Gate Bipolar Transistor) or the like can be listed.

Power feeding coil unit L1 is provided with power feeding coil L11 and is packaged by housing 600. Power feeding coil L11 functions as a power feeding unit which wirelessly transmits an alternating current power supplied from inverter INV to power receiving coil L12 described later. Further, when wireless power transmission device S1 is applied to a power supply facility for a vehicle such as an electric vehicle, power feeding coil unit L1 is disposed in the ground or in the vicinity of the ground. Further, the specific configuration of power feeding coil unit L1 will be described later.

Wireless power receiving device 200 is provided with power receiving coil unit L2, rectifier 230, charger 240.

Power receiving coil unit L2 is provided with power receiving coil L12 and magnetic shielding material 220, which two are packaged by housing 210. Here, power receiving coil L12 functions as a power receiving unit that receives an alternating current power wirelessly transmitted from power feeding coil L11 of wireless power feeding device 100. In addition, when wireless power transmission device S1 is applied to a power feeding facility for a vehicle such as an electric vehicle, power receiving coil unit L2 is mounted on the lower part of the electric vehicle. As power receiving coil L12, a coil in which a conductive wire is continuously wound, a coil which is formed by punching a plate material into a coil shape using press, a coil which is formed by bending a thin plate material into a coil shape, or the like can be listed. When power receiving coil L12 is formed by winding a conductive wire, the materials for the conductive wire can be copper, silver, gold, aluminum, or a metal wire including these as constituent components. From the viewpoint of weight reduction, aluminum wire, copper clad aluminum wire or the like may be used. From the viewpoint of achieving both weight reduction and high electrical conductivity, a copper clad aluminum wire is preferable, in which copper is uniformly coated around the aluminum wire. The copper clad aluminum wire is preferably used as a litz wire in which a large number of the copper clad aluminum wires are bundled and twisted together. Further, when power receiving coil L12 is formed by punching a plate material into a coil shape using press or when power receiving coil L12 is formed by bending a thin plate material into a coil shape, as the material of the plate material and the thin plate material, copper, silver, gold, aluminum, an alloy including these as a constituent component, or the like can be listed.

Magnetic shielding material 220 plays a role of eliminating or reducing the leakage of the magnetic field to the surroundings or the vehicle generated during the power feeding and receiving. Specifically, an eddy current is generated on the surface of magnetic shielding material 220 due to the magnetic field generated by power feeding coil L11 and power receiving coil L12 during the power feeding and receiving. Due to the eddy current, a magnetic field is generated on magnetic shield material 220 in a direction to offset the magnetic field generated during the power feeding and receiving, and thereby the leakage of the magnetic field, generated by power feeding coil L11 and power receiving coil L12 during the power feeding and receiving, to the surroundings or the vehicle is eliminated or reduced. Magnetic shielding material 220 is disposed on the back side of power receiving coil unit L2 (i.e., the vehicle side) in power receiving coil unit L2. As the materials of magnetic shielding material 220, copper, silver, gold, aluminum, metals including these as constituent components, or the like can be listed. In particular, from the viewpoint of emphasizing the cost, aluminum which is relatively cheap and has small metal resistance can be used. Further, power receiving coil unit L2 may be provided with a magnetic body between power receiving coil L12 and magnetic shielding material 220 to enhance the coupling between the feeding and receiving coils.

Rectifier 230 has a function of rectifying an alternating current power received by power receiving coil L12 into a direct current power. As rectifier 230, it is composed of a bridge-type circuit and a smoothing capacitor which is connected in parallel to the bridge-type circuit, wherein, in the bridge-type circuit, a plurality of switching elements such as a half-wave rectifying circuit and a full-wave rectifying circuit are bridge-connected, and the smoothing capacitor smoothes the rectified voltage to generate a direct current voltage.

Charger 240 charges electricity storage device 250 using a direct current power which is rectified by rectifier 230. Specifically, charger 240 is constituted by a charge controlling circuit for controlling the charging of electricity storage device 250, and performed the actions of converting the current and the voltage of the direct current power rectified by rectifier 230 and supplying it to electricity storage device 250 to store the electric energy. Electricity storage device 250 is not particularly restricted as long as it has a function of storing electric power, and for example, a secondary battery (lithium ion battery, lithium polymer battery, nickel-hydrogen battery, etc.), or a capacitive element (an electric double layer capacitor and etc.) can be listed. From the viewpoint of a high energy density, it is preferred to be a lithium ion battery. Further, charger 240 is not a necessary component, and it can be configured to directly supply the direct current power output from rectifier 230 to electricity storage device 250.

By providing such a configuration, wireless power transmission device S1, which transmits an electric power from power feeding coil L11 of wireless power feeding device 100 to power receiving coil L12 of wireless power receiving device 200 wirelessly, can be realized.

Figure 2:
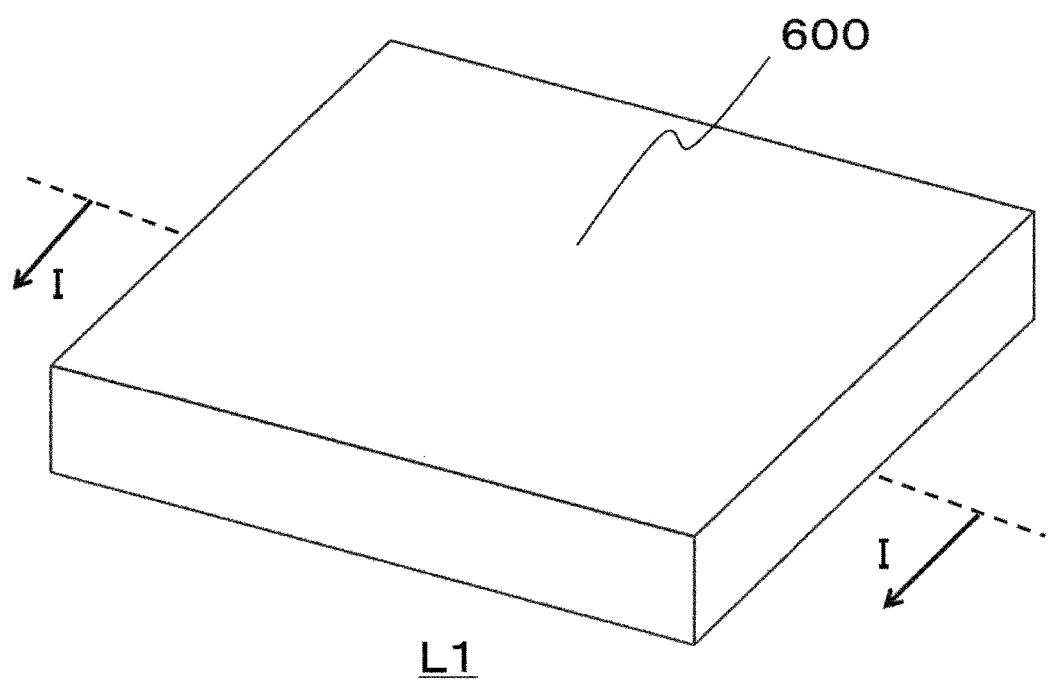
FIG. 2 is a schematic perspective view showing the power feeding coil unit in the wireless power transmission device according to the first embodiment of the present invention.
Figure 3:
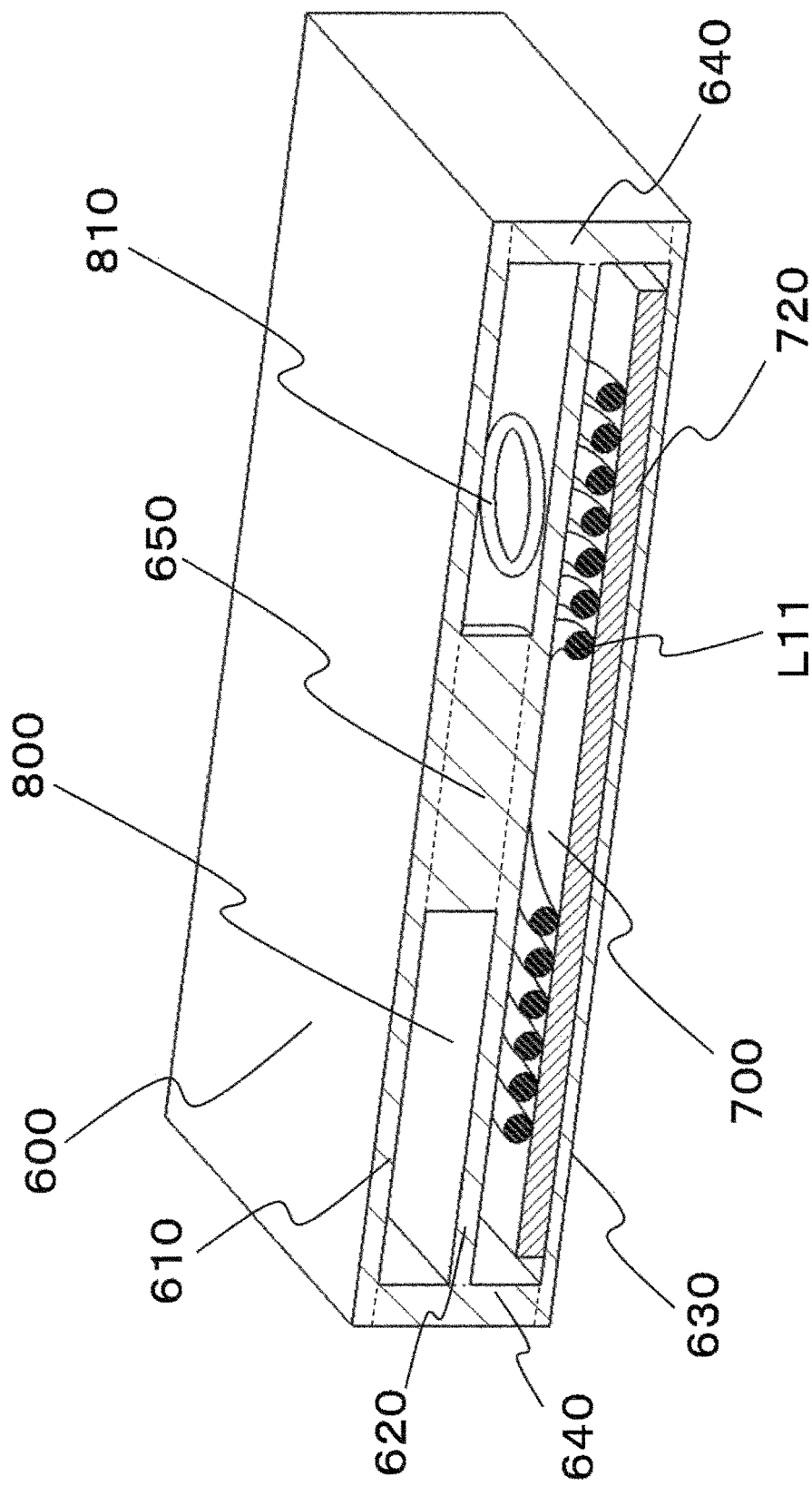
FIG. 3 is a schematic cross-sectional perspective view of the power feeding coil unit along the line I-I in FIG. 2.
Figure 4:
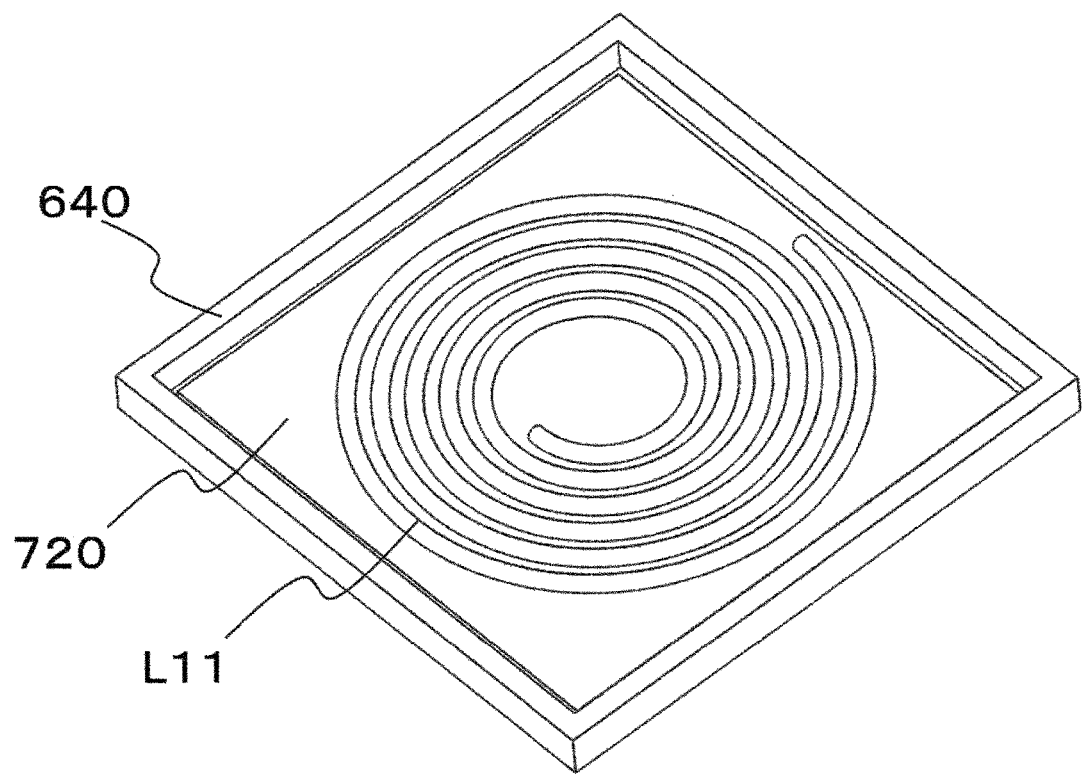
FIG. 4 is a schematic perspective view enlarging the power feeding coil and the space for the power feeding coil of the power feeding coil unit in FIG. 2 from a vertically upper side.
Figure 5:
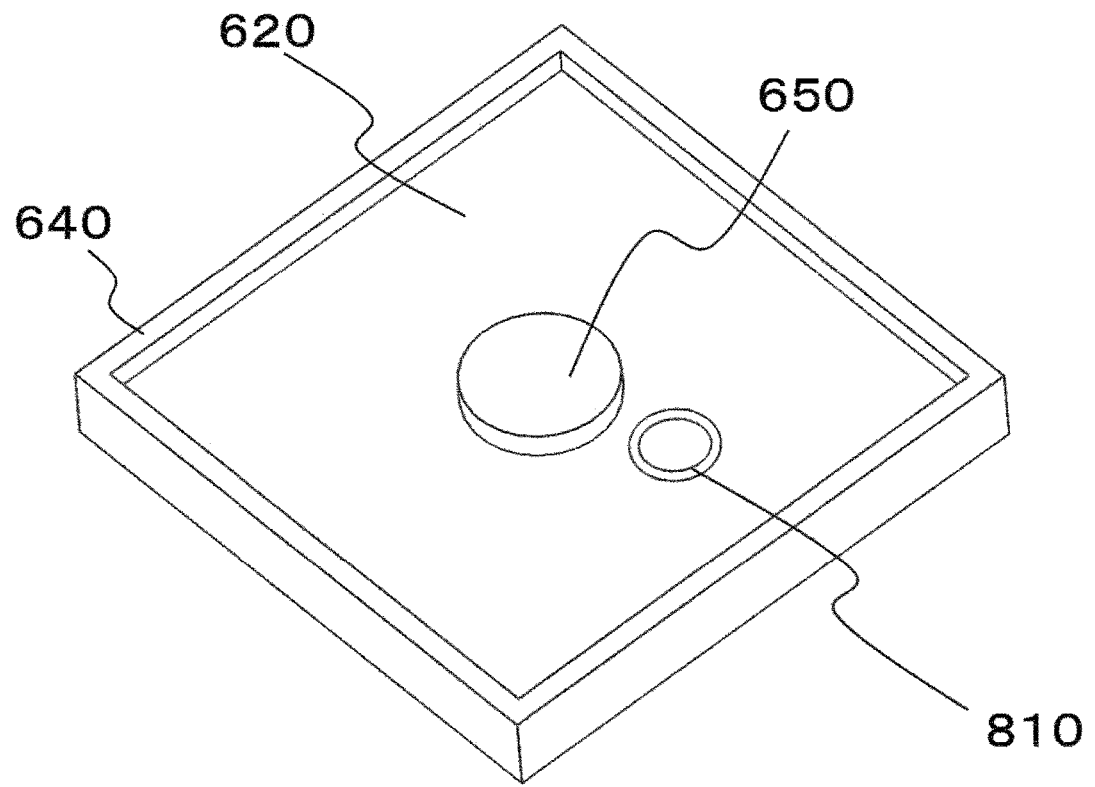
FIG. 5 is a schematic perspective view enlarging the sensor and the space for the sensor of the power feeding coil unit in FIG. 2 from a vertically upper side.

Next, with reference to FIGS. 2 to 5, the configuration of power supply coil unit L1 in wireless power transmission device S1 according to the first embodiment of the present invention will be described. FIG. 2 is a schematic perspective view showing the power feeding coil unit in the wireless power transmission device according to the first embodiment of the present invention. FIG. 3 is a schematic cross-sectional perspective view of the power feeding coil unit along the line I-I in FIG. 2. FIG. 4 is a schematic perspective view enlarging the power feeding coil and the space for the power feeding coil of the power feeding coil unit in FIG. 2 from a vertically upper side. FIG. 5 is a schematic perspective view enlarging the sensor and the space for the sensor of the power feeding coil unit in FIG. 2 from a vertically upper side.

As shown in FIG. 2 and FIG. 3, power feeding coil unit L1 is provided with housing 600, magnetic body 720, power feeding coil L11 and sensor 810. This power feeding coil unit L1 transmits electric power to the power receiving side wirelessly.

As shown in FIG. 2, housing 600 is presented as a cuboid shape. As the material of housing 600, insulating resins can be listed, such as acrylonitrile-butadiene-styrene copolymer (ABS), polybutylene terephthalate resin (PET), polyphenylene sulfide resin (PPS), fiber-reinforced plastic (FRP). Further, housing 600 may be composed of a plurality of portions and materials. Particularly, in order to eliminate or reduce the leakage of the magnetic field to the surroundings or the vehicles generated during the power feeding and receiving, a part of the materials of housing 600 (for example, bottom portion 630 of housing 600) can be made of copper, silver, gold, aluminum, a metal including these as constituent components, or the like. From the viewpoint of emphasizing cost, it is preferable to use aluminum which is relatively cheap and has small metal resistance. Further, although housing 600 is installed on the ground, an insulating material such as an insulating sheet or a resin, a thermal conductive material for improving heat dissipation such as a silicon thermal conductive sheet, a thermal conductive epoxy adhesive, a thermal conductive double-sided tape or the like, a member having a two-layer structure laminated with an insulator or a heat conductive material can be interposed. Further, in the present embodiment, the shape of the housing 600 is presented as cuboid, but it is not limited thereto, and it can be presented as various shapes such as a circular truncated cone shape, a truncated pyramid shape, a prism shape, an antiprism shape, and a dome shape.

In the present embodiment, housing 600 accommodates magnetic body 720, power feeding coil L11 and sensor 810. Particularly, as shown in FIG. 3, housing 600 is provided with dividing plate 620 which divides it into space for power feeding coil 700 for accommodating magnetic body 720 and power feeding coil L11 and space for sensor 800 for accommodating sensor 810. Space for sensor 800 is located vertically above space for power feeding coil 700. That is, space for sensor 800 is located closer to the power transmission side of power feeding coil unit L1 than space for feeding coil 700. Further, housing 600 is provided with pillar 650 in space for sensor 800.

As shown in FIG. 3 and FIG. 4, space for power feeding coil 700 is a space with a cuboid shape. Specifically, space for power feeding coil 700 is a space defined by bottom portion 630, side surface portion 640 and dividing plate 620 of housing 600. In the space inside this space for power feeding coil 700, power feeding coil L11 and magnetic body 720 are disposed. Further, in the present embodiment, the spatial shape of space for power feeding coil 700 is presented as a cuboid shape but it is not restricted thereto, and it can be presented as various shapes such as a truncated circular cone shape, a truncated pyramid shape, a prism shape, an antiprism shape, and a dome shape.

As shown in FIG. 3 and FIG. 5, space for sensor 800 is a space with a cuboid shape. Specifically, space for sensor 800 is a space defined by top portion 610, side surface portion 640 and dividing plate 620 of housing 600. In the space inside this space for sensor 800, pillar 650 is provided and sensor 810 is disposed. Further, in the present embodiment, the spatial shape of space for sensor 800 is presented as a cuboid shape but it is not restricted thereto, and it can be presented as various shapes such as a truncated circular cone shape, a truncated pyramid shape, a prism shape, an antiprism shape, and a dome shape.

Pillar 650 plays a role for maintaining the internal space of space for sensor 800. Specifically, as shown in FIG. 5, pillar 650 is a cylindrical column extending in a vertical direction from dividing plate 620 in space for sensor 800. Thereby, deformation of the internal space of space for sensor 800 caused by a load applied to housing 600 can be suppressed. That is, space for sensor 800 is supported by pillar 650. Herein, since space for sensor 800 is supported by pillar 650, the thickness of top portion 610 (the outer wall portion of housing 600 on the side where the vehicle runs on) of housing 600 can be reduced. As a result, the distance, between sensor 810 and the object which is to be detected, reduces, and thus the sensitivity of sensor 810 can be improved. On the other hand, when the load bearing performance of power feeding coil unit L1 is insufficient due to the reduction of the thickness of top portion 610 of housing 600, the load bearing performance of power feeding coil unit L1 can be maintained or improved while maintaining the distance between sensor 810 and the object to be detected by thickening the thickness of dividing plate 620 between space for power feeding coil 700 and space for sensor 800. That is, in order to ensure the load bearing performance of power feeding coil unit L1 while improving the sensitivity of sensor 810, the thickness of top portion 610 of housing 600 can be set to a thickness which can ensure a desired sensitivity of sensor 810 and the thickness of dividing plate 620 of housing 600 can be thickened to be thicker than the thickness of top portion 610 of this housing 600. Further, in the present embodiment, pillar 650 is presented as a cylindrical column shape, but it is not limited thereto, and it may be presented as various shapes such as a truncated circular cone shape, a truncated pyramid shape, a prism shape, and an antiprism shape. Further, in the present embodiment, pillar 650 is provided to be positioned substantially at the center of sensor space 800, but it is not limited thereto, and it may be provided at an arbitrary location. However, in order to improve the load bearing performance, it is preferable to be disposed to obtain a largest distance between pillar 650 and side portion 640 of housing 600, i.e., to be disposed in the center. Furthermore, in the present embodiment, the vertically upper end portion of pillar 650 is in contact with top portion 610 of housing 600 in space for sensor 800, but as long as the internal space of space for sensor 800 can be held, a gap may be provided between top portion 610 of housing 600 and the vertically upper end portion of pillar 650.

As shown in FIG. 4, magnetic body 720 is presented as a substantially square flat plate shape when viewed from a vertical direction, and is placed on bottom portion 630 of housing 600 in power feeding coil space 700. That is, magnetic body 720 is placed on the inner surface portion of housing 600 opposite to the power transmission side of power feeding coil unit L1. This magnetic body 720 provides an effect of reducing the magnetic resistance of the magnetic path and enhancing the magnetic coupling between the coils. As the materials of magnetic body 720, sendust, MnZn ferrite, permalloy or the like can be listed. The higher the magnetic permeability and electric resistance of magnetic body 720, the more preferable it is. Among these materials, MnZn ferrite is particularly preferred. Further, in the present embodiment, the shape of magnetic body 720 was presented as a substantially square shape when viewed from a vertical direction, but it is not limited thereto, and it may present as various shapes such as a rectangle, a polygon, a circle, an ellipse, and etc. Further, in the present embodiment, magnetic body 720 is configured as one member, but the present invention is not limited thereto, and it can be composed of a plurality of magnetic member pieces. The shapes of the pieces can be a combination of various shapes. Further, an insulating material such as an insulating sheet or a resin may be interposed between magnetic body 720 and bottom portion 630 of housing 600 in space for power feeding coil 700.

Power feeding coil L11 transmits the alternating current power supplied from inverter INV to power receiving coil L12. Specifically, an alternating current flows through power feeding coil L11 to generate an alternating current magnetic field by applying an alternating current voltage from inverter INV to power feeding coil L11, and the electric power is transmitted to power receiving coil L12 via the alternating current magnetic field. As shown in FIG. 4, power supply coil L11 is installed on bottom portion 630 of housing 600 in space for power feeding coil 700 with magnetic body 720 interposed therebetween. That is, power feeding coil L11 is installed on the inner surface portion on the side opposite to the power transmission side of power feeding coil unit L1 of housing 600 in space for power feeding coil 700 with magnetic body 720 interposed therebetween. Further, in the present embodiment, power feeding coil L11 is configured by winding the conductive wire continuously, but the present invention is not limited thereto, and it may be a plate-shaped coil formed by punching a plate material into a coil shape using press, or a coil formed by bending a thin plate material into a coil shape, or the like. Further, as the coil type of the coil configured by winding the conductive wire continuously, a spiral coil, a solenoidal coil, a coil made from a combination thereof, or the like can be listed. Further, as the coil type of the plate-shaped coil formed by punching a plate material into a coil shape using press and the coil formed by bending a thin plate material into a coil shape, a spiral coil, a coil made from a combination thereof, or the like can be listed. In the present embodiment, power feeding coil L11 is configured by continuously winding conductive wires into a planar shape and is disposed in space for power feeding coil 700 with the coil-winding axis direction being substantially parallel to the vertical direction. In addition, in the present embodiment, power feeding coil L11 is presented as a circle shape when viewed from the vertical direction, but it is not limited thereto, and it may be presented as various shapes such as a rectangle, a polygon, an ellipse, and etc. Furthermore, as the material of the conductive wire when power feeding coil L11 is configured by winding a conductive wire, copper, silver, gold, aluminum, or a metal wire including these as constituent components can be listed. From the viewpoint of weight reduction, aluminum wire, copper clad aluminum wire or the like may be used. From the viewpoint of achieving both weight reduction and electrical conductivity, a copper clad aluminum wire is preferable, in which copper is uniformly coated around the aluminum wire. The copper clad aluminum wire is preferably used as a litz wire in which a large number of the copper clad aluminum wires are bundled and twisted together. On the other hand, when power feeding coil L11 is formed by punching a plate material into a coil shape using press or when power feeding coil L11 is formed by bending a thin plate material into a coil shape, as the material of the plate material and the thin plate material, copper, silver, gold, aluminum, an alloy including these as constituent components, or the like can be listed. Herein, between power feeding coil L11 and magnetic body 720, a bobbin (not shown) which plays a role of winding and fixing power feeding coil L11 to the coil core and/or a role of insulating power feeding coil L11 and magnetic body 720 can be provided. As the material of this bobbin, it is preferred to be an insulating resin. For example, acrylonitrile-butadiene-styrene copolymer (ABS), polybutylene terephthalate resin (PET), polyphenylene sulfide resin (PPS), fiber-reinforced plastic (FRP) or the like can be listed.

Sensor 810 detects an object existing above or around power feeding coil unit L1. Specifically, sensor 810 includes a living body detection sensor which detects a living body around power feeding coil unit L1, a position detection sensor which detects a vehicle on which wireless power receiving device 200 is mounted to prevent the position deviation of the power feeding and receiving, a metal detection coil for detecting that a foreign metal is interfused between power feeding coil unit L1 and power receiving coil unit L2 or the like can be listed. Thereby, the information detected by sensor 810 is sent to various devices such as the vehicle, power supply VG, inverter INV, or the like, and thus the power transmission can be performed according to the circumstances of power feeding coil unit L1. In the present embodiment, sensor 810 is a metal detection coil and is composed of a ring-shaped coil. That is, the metal detection coil as sensor 810 is hollow coil provided with a hole penetrating in a vertical direction. Herein, the function of the metal detection coil as sensor 810 will be described in detail. The metal detection coil detects that a foreign metal is interfused between power feeding coil unit L1 and power receiving coil unit L2. Specifically, a change in increase or decrease in the magnetic flux generated by a foreign metal interfused between power feeding coil unit L1 and power receiving coil unit L2 is detected by the metal detection coil. Thereby, when a foreign metal is interfused in a range in which power feeding coil unit L1 may be influenced by the generated magnetic field, a warning or a power feeding stop may be immediately prompted by the electric signal detected by the metallic detection coil. Further, in the present embodiment, the metal detection coil is constituted by a ring-shaped coil, but the material and/the shape is not limited particularly as long as it can detect the foreign metal. It can be a coil constituted by a printed coil, a coil configured by winding the conductive wire into a spiral structure continuously, or a coil formed by punching a plate material into a coil shape using press. However, it is preferred to be a print coil which can be manufactured in a large number in a single substrate and the production speed of which is fast from the viewpoint of cost. Further, when sensor 810 is constructed by a print coil, a substrate formed by printing a conductive pattern of print coil can be used as dividing plate 620.

In the present embodiment, sensor 810 is disposed on dividing plate 620 of housing 600 in space for sensor 800. The disposing position of sensor 810 can be arranged at any position as long as it is disposed on dividing plate 620 of housing 600 in space for sensor 800. Further, sensor 810 is disposed on dividing plate 620 without contacting with the upper inner surface portion of housing 600 (the inner surface portion of top portion 610 of housing 600). That is, in space for sensor 800, a gap is ensured between sensor 810 and top portion 610 of housing 600. In other words, in space for sensor 800, a gap is ensured between sensor 810 and the inner surface portion of housing 600 on the side where the vehicle runs on. Since the gap exists, external stress such as a shock and a load when the vehicle runs on is not directly transmitted and can be prevented from being transmitted to sensor 810. Herein, when a gap is provided between the vertically upper end portion of pillar 650 and top portion 610 of housing 600, it is preferred to set the gap between the vertically upper end of pillar 650 and top portion 610 of housing 600 to be smaller than the gap between sensor 810 and top portion 610 of casing 600. Further, it is preferable that sensor 810 is disposed in space for sensor 800 without contacting with side surface portion 640 of housing 600. In this case, the transmission of stress to sensor 810 can be further suppressed. Further, in the present embodiment, the shape of sensor 810 is presented as a ring shape, but it is not limited thereto, and it can be presented as various shapes.

As described above, in wireless power transmission device S1 according to the present embodiment, housing 600 is provided with dividing plate 620 and at least one pillar 650 for maintaining the internal space of space for sensor 800, wherein, dividing plate 620 divides housing 600 into space for power feeding coil 700 for accommodating power feeding coil L11 and space for sensor 800 for accommodating sensor 810. Sensor 810 is disposed on dividing plate 620 without contacting with the upper inner surface portion of housing 600 in space for sensor 800. Therefore, space for sensor 800 is supported by pillar 650, thus, the load bearing performance of power feeding coil unit L1 can be ensured. Further, in space for sensor 800, since a gap can be ensured between the inner surface portion of housing 600 on the side where the vehicle runs on and sensor 810, the external stress such as a shock or a load when the vehicle runs on can be prevented from being directly transmitted to sensor 810. Therefore, it is possible to ensure the load bearing performance of power feeding coil unit L1 while suppressing the transmission of a stress to sensor 810 installed inside power feeding coil unit L1 when an external stress is applied.

Second Embodiment

Figure 6:
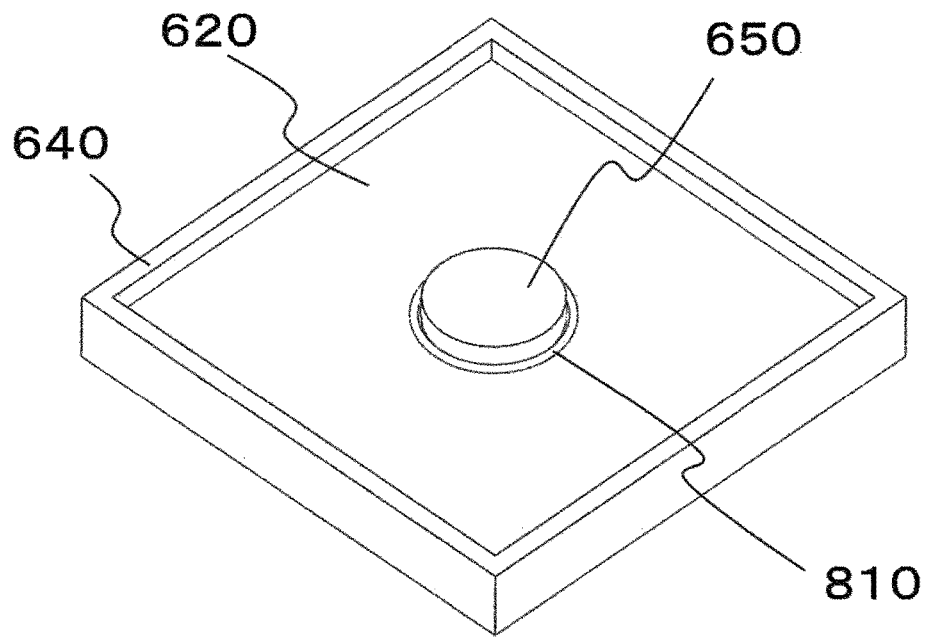
FIG. 6 is a schematic perspective view enlarging the sensor and the space for the sensor of the power feeding coil unit according to the second embodiment of the present invention from a vertically upper side, which corresponds to the schematic perspective view enlarging the sensor and the space for the sensor of the power feeding coil unit according to the first embodiment of the present invention from a vertically upper side as shown in FIG. 5.

Next, a wireless power transmission device according to the second embodiment of the present invention will be described with reference to FIG. 6. FIG. 6 is a schematic perspective view enlarging the sensor and the space for the sensor of the power feeding coil unit according to the second embodiment of the present invention from a vertically upper side, which corresponds to the schematic perspective view enlarging the sensor and the space for the sensor of the power feeding coil unit according to the first embodiment of the present invention from a vertically upper side as shown in FIG. 5. The wireless power transmission device according to the second embodiment is different from the first embodiment on the points of the shape and the disposition of sensor 810 in space for sensor 800 of power feeding coil unit L1 and the other configurations are the same as those of wireless power transmission device S1 according to the first embodiment. Hereinafter, differences from the first embodiment will be mainly described.

As shown in FIG. 6, in the present embodiment, sensor 810 is provided with a hole penetrating in a vertical direction. Further, sensor 810 is disposed with pillar 650 extending through the hole of sensor 810. That is, pillar 650 extends vertically from dividing plate 620 through the hole of sensor 810 in space for sensor 800. Therefore, since sensor 810 is close to pillar 650 which play a role of maintaining the internal space of space for sensor 800, the internal space around sensor 810 in space for sensor 800 can be held. By maintaining the internal space, external stress such as a shock and a load when the vehicle runs on is not directly transmitted and can be prevented from being transmitted to sensor 810. Further, it is preferable that sensor 810 is disposed without contacting with pillar 650. In this case, the transmission of stress to sensor 810 can be further suppressed. Further, in the present embodiment, the shape of sensor 810 is presented as a ring shape, but it is not limited thereto, and it can be presented as various shapes. In the case where sensor 810 is a ring-shaped coil, since the hole of sensor 810 is present originally, the space in space for sensor 800 can be effectively used.

As described above, in the wireless power transmission device according to the present embodiment, in the power feeding coil unit L1, sensor 810 is provided with a hole penetrating vertically, and pillar 650 penetrates the hole of sensor 810 and extends in the vertical direction. Therefore, the internal space around sensor 810 of space for sensor 800 can be held. By maintaining the internal space, external stress such as a shock and a load when the vehicle runs on is not directly transmitted and can be prevented from being transmitted to sensor 810.

Third Embodiment

Figure 7:
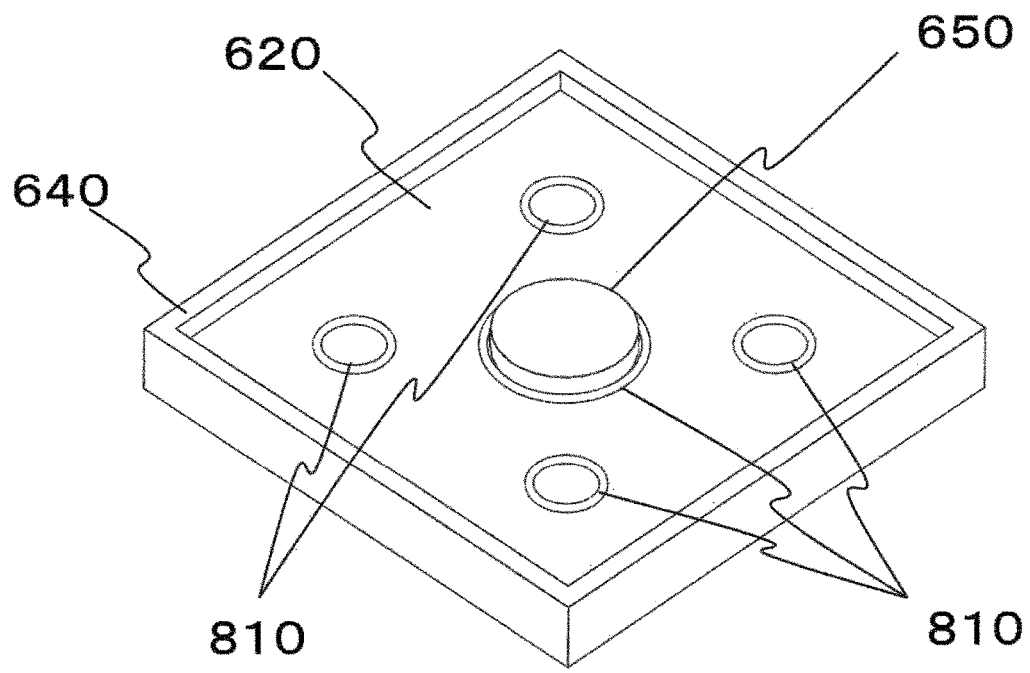
FIG. 7 is a schematic perspective view enlarging the sensor and the space for the sensor of the power feeding coil unit according to the third embodiment of the present invention from a vertically upper side, which corresponds to the schematic perspective view enlarging the sensor and the space for the sensor of the power feeding coil unit according to the first embodiment of the present invention from a vertically upper side as shown in FIG. 5.

Next, a wireless power transmission device according to the third embodiment of the present invention will be described with reference to FIG. 7. FIG. 7 is a schematic perspective view enlarging the sensor and the space for the sensor of the power feeding coil unit according to the third embodiment of the present invention from a vertically upper side, which corresponds to the schematic perspective view enlarging the sensor and the space for the sensor of the power feeding coil unit according to the first embodiment of the present invention from a vertically upper side as shown in FIG. 5. The wireless power transmission device according to the third embodiment is different from the first embodiment on the point that there are a plurality of sensors 810 in power feeding coil unit L1, and the other configurations are the same as those of wireless power transmission device S1 according to the first embodiment. Hereinafter, the difference from the first embodiment will be mainly described.

As shown in FIG. 7, in the present embodiment, power feeding coil unit L1 is provided with a plurality of sensors 810. The positions of the plurality of sensors 810 can be arranged at any positions on dividing plate 620 of housing 600 in space for sensor 800. Compared to a case where there is one sensor 810, the ratio of the area, where sensors 810 exist, relative to housing 600 can be increased in the case where a plurality of sensors 810 is provided. Therefore, the area where the object can be detected by sensors 810 can be broadened. Further, as described above in the second embodiment, as shown in FIG. 7, any sensor 810 among the plurality of sensors 810 may be disposed with hole through which pillar 650 can pass. In the present embodiment, each of the plurality of sensors 810 is provided with a hole penetrating in a vertical direction and is composed of five sensors totally consisting of one sensor which is a coil presented as a ring shape disposed with pillar 650 passing through the hole and four sensors disposed around pillar 650. The plurality of sensors 810 are disposed on dividing plate 620 to be separated from each other. Herein, when sensor 810 is a coil for detecting metal, it is preferred to be constituted by sensors 810 spread to cover a region where the magnetic flux generated by power feeding coil L11 interlinks. Thereby, the undetectable region of foreign metal can be reduced and the foreign metal interfused between power feeding coil unit L1 and power receiving coil unit L2 can be detected precisely.

As described above, the wireless power transmission device according to the present embodiment has a plurality of sensors 810 in power feeding coil unit L1. Therefore, compared with a case where there is only one sensor 810, the ratio of the area where sensors 810 exist relative to housing 600 can be increased in the case where a plurality of sensors 810 is provided. That is, the area where the object can be detected by sensors 810 can be broadened.

Fourth Embodiment

Figure 8:
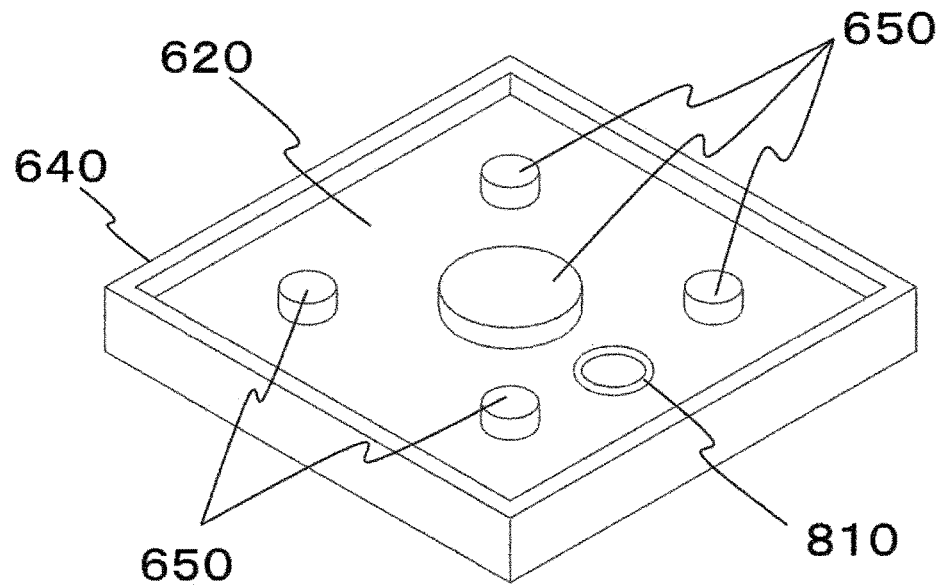
FIG. 8 is a schematic perspective view enlarging the sensor and the space for the sensor of the power feeding coil unit according to the fourth embodiment of the present invention from a vertically upper side, which corresponds to the schematic perspective view enlarging the sensor and the space for the sensor of the power feeding coil unit according to the first embodiment of the present invention from a vertically upper side as shown in FIG. 5.

Next, a wireless power transmission device according to the fourth embodiment of the present invention will be described with reference to FIG. 8. FIG. 8 is a schematic perspective view enlarging the sensor and the space for the sensor of the power feeding coil unit according to the fourth embodiment of the present invention from a vertically upper side, which corresponds to the schematic perspective view enlarging the sensor and the space for the sensor of the power feeding coil unit according to the first embodiment of the present invention from a vertically upper side as shown in FIG. 5. The wireless power transmission device according to the fourth embodiment is different from the first embodiment on the point that housing 600 is provided with a plurality of pillars 650 in power feeding coil unit L1, and the other configurations are the same as those of wireless power transmission device S1 according to the first embodiment. Hereinafter, the difference from the first embodiment will be mainly described.

As shown in FIG. 8, in the present embodiment, housing 600 is provided with a plurality of pillars 650 in power feeding coil unit L1. Since housing 600 is provided with a plurality of pillars 650, the positions for supporting the load applied to housing 600 will be a plurality of places, and the external stress can be dispersed. Thereby, the load bearing performance of power feeding coil unit L1 can be further ensured. Further, the positions of the plurality of pillars 650 can be disposed in any position in space for sensor 800. In particular, in order to improve the load bearing performance, it is preferable that the distances between the plurality of pillars 650 and side surface portion 640 of housing 600 are equal and are the maximum. Further, the plurality of pillars 650 may be in different sizes or may have the same size. In the present embodiment, among the plurality of pillars 650, the size of the pillar 650 located substantially at the center in space for sensor 800 is the largest. In this case, it is possible to ensure the load bearing performance at the central portion of casing 600, which is most easily influenced by the deformation due to the load.

As described above, in the wireless power transmission device according to the present embodiment, housing 600 is provided with a plurality of pillars 650 in power feeding coil unit L1. Therefore, the positions for supporting the load applied to housing 600 will be a plurality of places, thus, the external stress can be dispersed.

Fifth Embodiment

Figure 9:
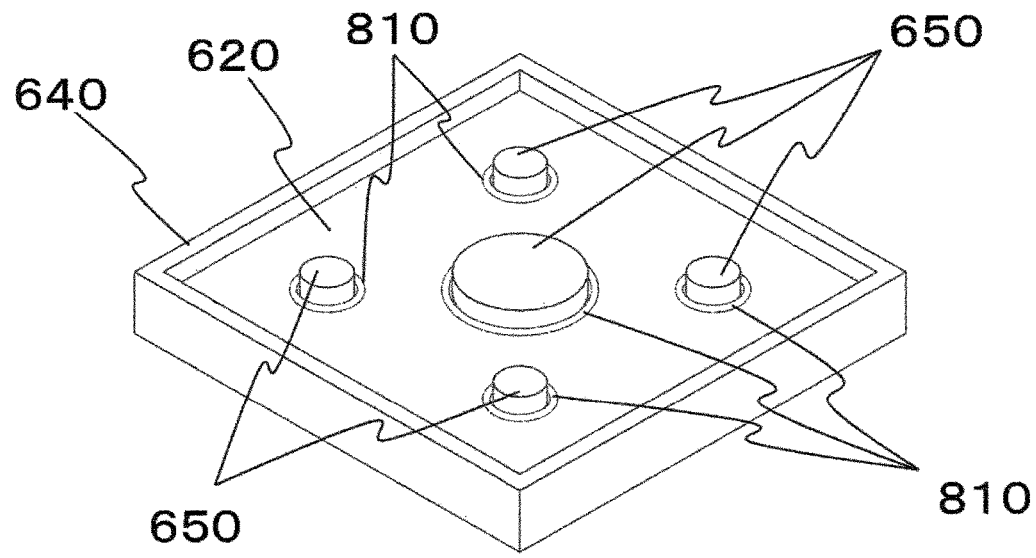
FIG. 9 is a schematic perspective view enlarging the sensor and the space for the sensor of the power feeding coil unit according to the fifth embodiment of the present invention from a vertically upper side, which corresponds to the schematic perspective view enlarging the sensor and the space for the sensor of the power feeding coil unit according to the first embodiment of the present invention from a vertically upper side as shown in FIG. 5.

Next, a wireless power transmission device according to the fifth embodiment of the present invention will be described with reference to FIG. 9. FIG. 9 is a schematic perspective view enlarging the sensor and the space for the sensor of the power feeding coil unit according to the fifth embodiment of the present invention from a vertically upper side, which corresponds to the schematic perspective view enlarging the sensor and the space for the sensor of the power feeding coil unit according to the first embodiment of the present invention from a vertically upper side as shown in FIG. 5. The wireless power transmission device according to the fifth embodiment is different from the first embodiment on the points that there are a plurality of sensors 810 and housing 600 is provided with a plurality of pillars 650 in power feeding coil unit L1, and the other configurations are the same as those of wireless power transmission device S1 according to the first embodiment. Hereinafter, the differences from the first embodiment will be mainly described.

As shown in FIG. 9, in the present embodiment, power feeding coil unit L1 is provided with a plurality of sensors 810 and housing 600 is provided with a plurality of pillars 650. Thereby, the area where the object can be detected by sensors 810 can be broadened and the load bearing performance of power feeding coil unit L1 can be further ensured. The positions of the plurality of sensors 810 and the plurality of pillars 650 can be arranged to be any positions.

In this embodiment, each of the plurality of sensors 810 is provided with a hole penetrating in a vertical direction and is presented as a coil of ring shape; and the plurality of pillars 650 pass through the holes of the plurality of sensors 810 respectively and extend in the vertical direction. Further, although it is not shown, the plurality of sensors 810 do not necessarily need to be disposed with each of the pillars 650 passing through the hole of sensors 810 respectively. Both of a sensor 810 disposed with a pillar 650 passing through it and a sensor 810 without pillar 650 passing through it can be provided. Further, the number of the plurality of sensors 810 and the number of the plurality of pillars 650 is not necessarily the same, and they can be appropriately set based on the detection area of the object and the load bearing performance.

As described above, in the wireless power transmission device according to the present embodiment, power feeding coil unit L1 is provided with a plurality of sensors 810. Thus, compared to a case that there is one sensor 810, the ratio of the area where sensors 810 exist relative to housing 600 can be increased in the case where a plurality of sensors 810 is provided. That is, the area where the object can be detected by sensors 810 can be broadened.

Further, in the wireless power transmission device according to the present embodiment, housing 600 is provided with a plurality of pillars 650 in power feeding coil unit L1. Thus, the positions for supporting the load applied to housing 600 will be a plurality of places, thus, the external stress can be dispersed.

Sixth Embodiment

Figure 10:
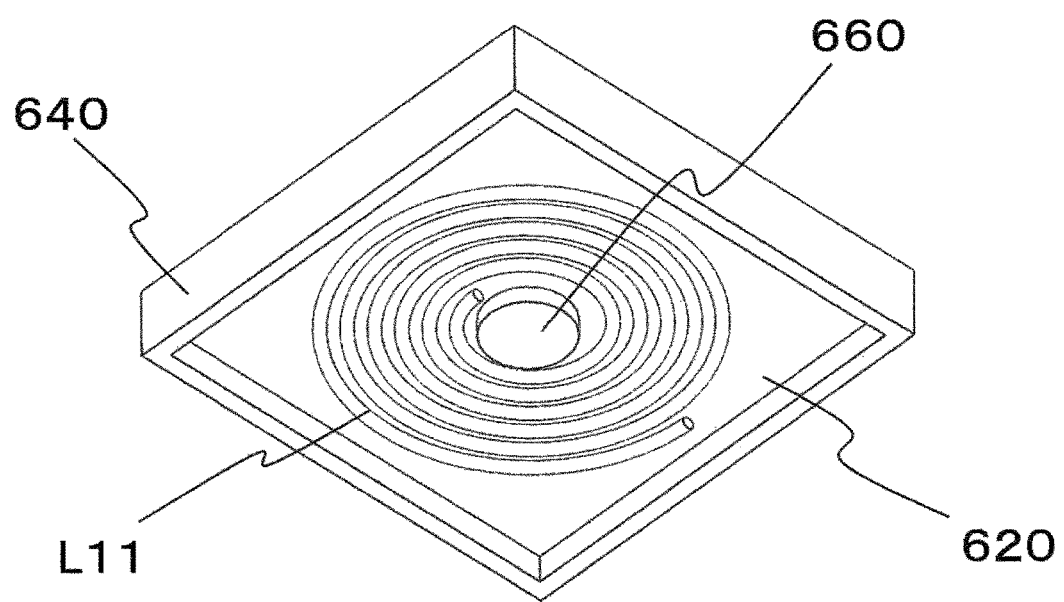
FIG. 10 is a schematic perspective view enlarging the power feeding coil and the space for the power feeding coil of the power feeding coil unit in the wireless power transmission device according to the sixth embodiment of the present invention from a vertically lower side.
Figure 11:
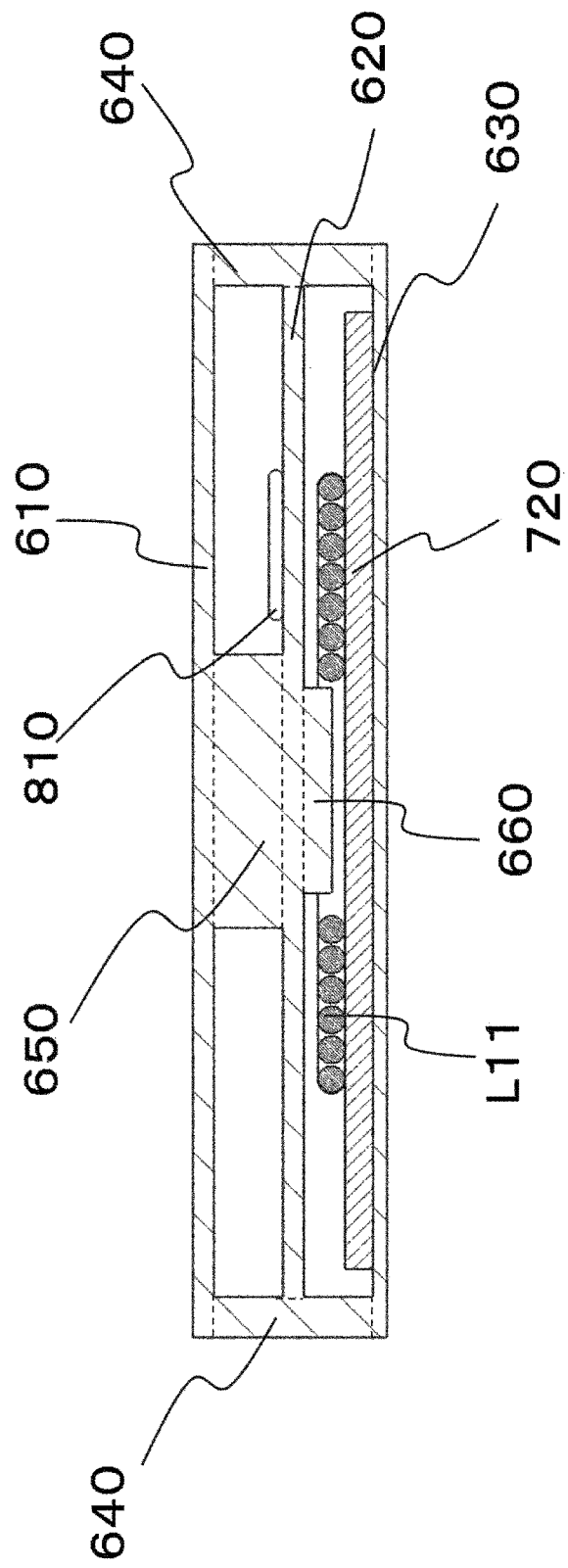
FIG. 11 is a schematic cross-sectional view of the power feeding coil unit according to the sixth embodiment of the present invention.

Next, a wireless power transmission device according to the sixth embodiment of the present invention will be described with reference to FIG. 10 and FIG. 11. FIG. 10 is a schematic perspective view enlarging the power feeding coil and the space for the power feeding coil of the power feeding coil unit in the wireless power transmission device according to the sixth embodiment of the present invention from a vertically lower side. FIG. 11 is a schematic cross-sectional view of the power feeding coil unit according to the sixth embodiment of the present invention. The wireless power transmission device according to the sixth embodiment is different from the first embodiment on the point that housing 600 is provided with projecting part 660 in power feeding coil unit L1 and the other configurations are the same as those of wireless power transmission device S1 according to the first embodiment. Hereinafter, the difference from the first embodiment will be mainly described.

As shown in FIG. 10 and FIG. 11, in the present embodiment, housing 600 is provided with projecting part 660 extending vertically downward from dividing plate 620 in space for power feeding coil 700. Thereby, in the portion where projecting part 660 and dividing plate 620 are connected, the thickness of dividing plate 620 can be increased by the height of projecting part 660. That is, the thickness of dividing plate 620 supporting the load from pillar 650 can be increased by the height of projecting part 660 against the external stress applied to housing 600. Therefore, the load bearing performance of power feeding coil unit L1 can be improved. In the present embodiment, projecting part 660 extends to pass through the hollow center portion of power feeding coil L11. In other words, in power feeding coil L11, conductive wires are wound with projecting part 660 as its central axis. Further, in the present embodiment, projecting part 660 is presented as columnar shape, but it is not limited thereto, and it can be presented as various shapes such as a circular truncated cone shape, a truncated pyramid shape, a prism shape, an antiprism shape, and etc. Furthermore, in the present embodiment, projecting part 660 is provided be positioned substantially at the center of space for power feeding coil 700, but it is not limited thereto, and it can be provided at any location. However, in order to improve the load bearing performance, it is preferred to be disposed to obtain a largest distance between projecting part 660 and side surface portion 640 of housing 600, i.e., to be disposed in the center. Furthermore, in the present embodiment, a gap may be provided between the vertically lower end of projecting part 660 and magnetic body 720 in space for power feeding coil 700. From the viewpoint of the load bearing performance, it is preferable that the projecting height of projecting part 660 is as high as possible, and an opening through which projecting part 660 can pass is set in magnetic body 720, and projecting part 660 can be configured to extend through the opening of magnetic body 720. At this time, if the vertically lower end of projecting part 660 is configured to be in contact with bottom portion 630 of housing 600, an external stress such as a shock or a load or the like when the vehicle runs on can be prevented from being directly transmitted to magnetic body 720. Therefore, the load bearing performance of power feeding unit L1 can be further ensured.

As described above, in the wireless power transmission device according to the present embodiment, housing 600 is provided with projecting part 660 extending vertically downward from dividing plate 620 in space for power feeding coil 700. Therefore, the thickness of dividing plate 620 supporting the load from pillar 650 can be increased by the height of projecting part 660 against the external stress applied to housing 600 and the load bearing performance of power feeding unit L1 can be ensured.

Seventh Embodiment

Figure 12:
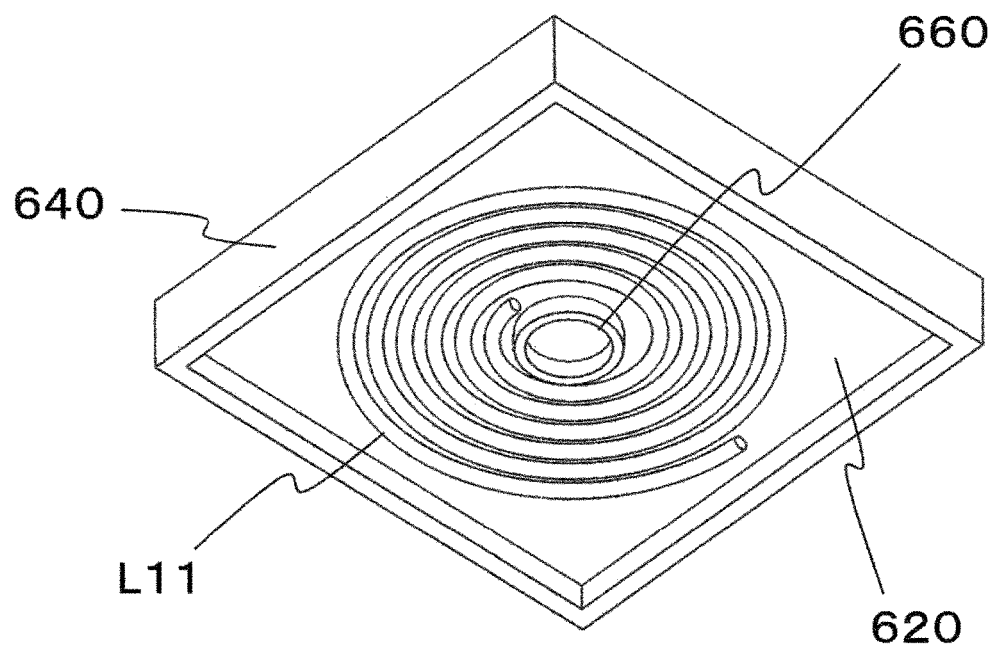
FIG. 12 is a schematic perspective view enlarging the power feeding coil and the space for the power feeding coil of the power feeding coil unit in the wireless power transmission device according to the seventh embodiment of the present invention from a vertically lower side.

Next, a wireless power transmission device according to the seventh embodiment of the present invention will be described with reference to FIG. 12. FIG. 12 is a schematic perspective view enlarging the power feeding coil and the space for the power feeding coil of the power feeding coil unit in the wireless power transmission device according to the seventh embodiment of the present invention from a vertically lower side. The wireless power transmission device according to the seventh embodiment is different from the sixth embodiment on the shape of projecting part 660 of housing 600 in power feeding coil unit and the other configurations are the same as those of the sixth embodiment. Hereinafter, the difference from the sixth embodiment will be mainly described.

As shown in FIG. 12, in the present embodiment, projecting part 660 is presented as a hollow tubular. Thereby, small components (not shown) such as electronic component or the like can be installed in the hollow of projecting part 660, and the space can be effectively utilized in space for power feeding coil 700. For example, small components such as electronic component or the like can be mounted on dividing plate 620 in the hollow of projecting part 660. Also in the present embodiment, similar to the sixth embodiment, an opening through which projecting part 660 can pass through can be provided in magnetic body 720 and projecting part 660 can be configured to extend through the opening of magnetic body 720. At this time, small components such as electronic component or the like can be installed on dividing plate 620 in the hollow of projecting part 660 and also can be mounted on bottom portion 630 of housing 600 with a part of the small component such as an electronic component or the like located in the hollow of projecting part 660. Further, it can be configured with the vertical lower end of projecting part 660 being in contact with bottom portion 630 of housing 600 and it can also be configured to provide a gap between the vertical lower end of projecting part 660 and bottom portion 630 of housing 600. When there is a gap between the vertical lower end of projecting part 660 and bottom portion 630 of housing 600, it is easy to arrange the wiring of small components such as electronic components installed in the hollow of projecting part 660.

As described above, in the wireless power transmission device according to the present embodiment, projecting part 660 is presented as a hollow tubular in power feeding coil unit L1. Thereby, small components such as electronic component or the like can be installed in the hollow and the space can be effectively utilized.

Eighth Embodiment

Figure 13:
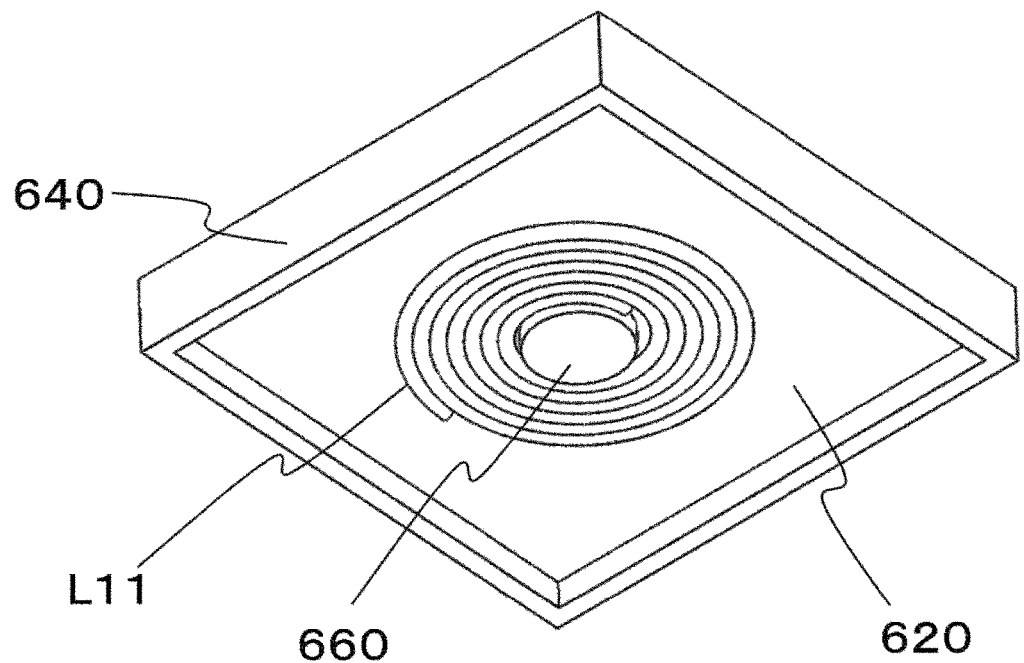
FIG. 13 is a schematic perspective view enlarging the power feeding coil and the space for the power feeding coil of the power feeding coil unit in the wireless power transmission device according to the eighth embodiment of the present invention from a vertically lower side.

Next, a wireless power transmission device according to the eighth embodiment of the present invention will be described with reference to FIG. 13. FIG. 13 is a schematic perspective view enlarging the power feeding coil and the space for the power feeding coil of the power feeding coil unit in the wireless power transmission device according to the eighth embodiment of the present invention from a vertically lower side. The wireless power transmission device according to the eighth embodiment is different from the sixth embodiment on the configuration of power feeding coil L11 in power feeding coil unit and the other configurations are the same as those of the sixth embodiment. Hereinafter, the difference from the sixth embodiment will be mainly described.

As shown in FIG. 13, in the present embodiment, the conductive wire is wound with projecting part 660 as the central axis and the inner peripheral edge of power feeding coil L11 is contacting with projecting part 660 in power feeding coil L11. That is, the innermost conductive wire of power feeding coil L11 is in contact with projecting part 660. Thereby, the heat dissipation area is increased, and the heat generated from power feeding coil L11 is efficiently released to the exterior through housing 600. Therefore, the heat dissipation of power feeding coil unit L1 can be improved.

As described above, in the wireless power transmission device according to the present embodiment, power feeding coil L11 is wound with its inner peripheral edge contacting with projecting part 660 in power feeding coil unit L1. Thereby, projecting part 660 and power feeding coil L11 is contacted, thus, the heat dissipation area is increased, and the heat generated from power feeding coil L11 is efficiently released to the exterior through housing 600. Thus, the heat dissipation of power feeding coil unit L1 can be improved.

Ninth Embodiment

Figure 14:
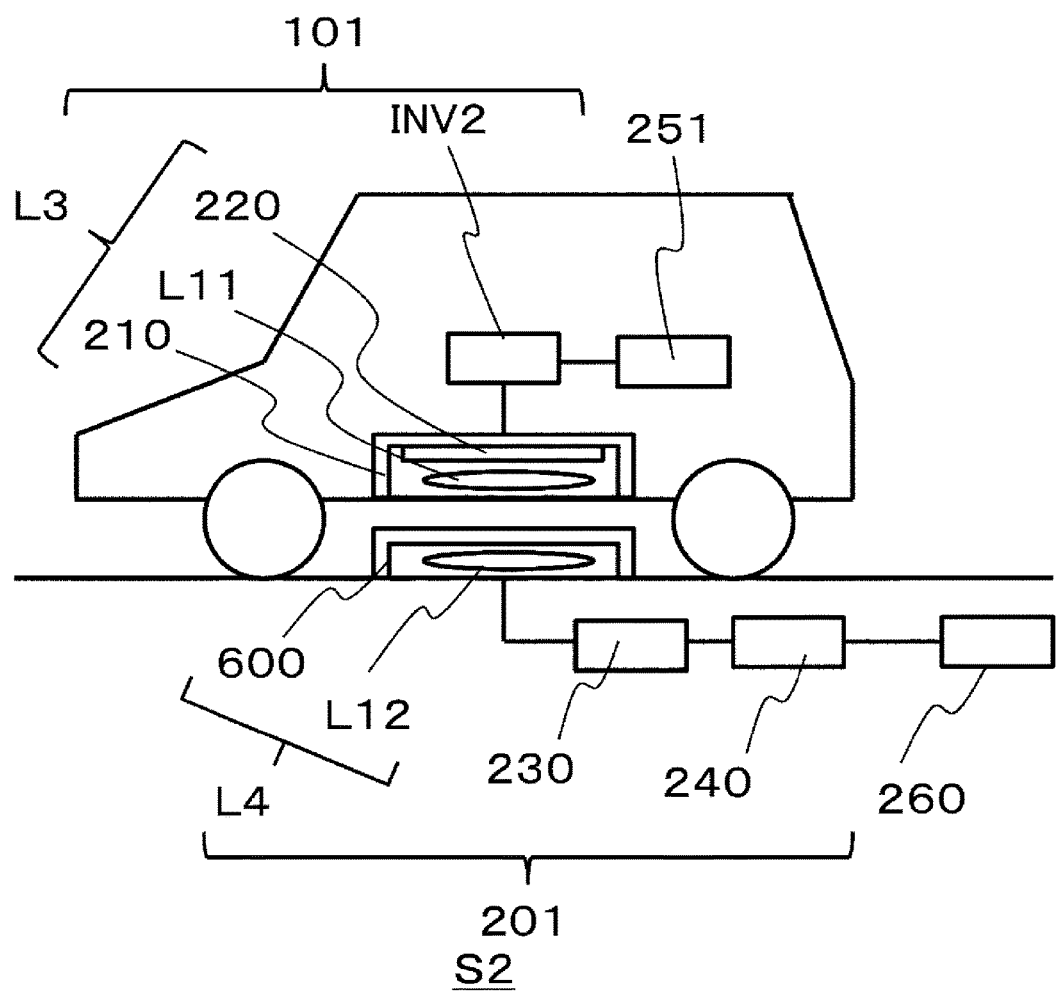
FIG. 14 is a schematic view showing the wireless power transmission device according to the ninth embodiment of the present invention together with the electricity storage device.
Figure 15:
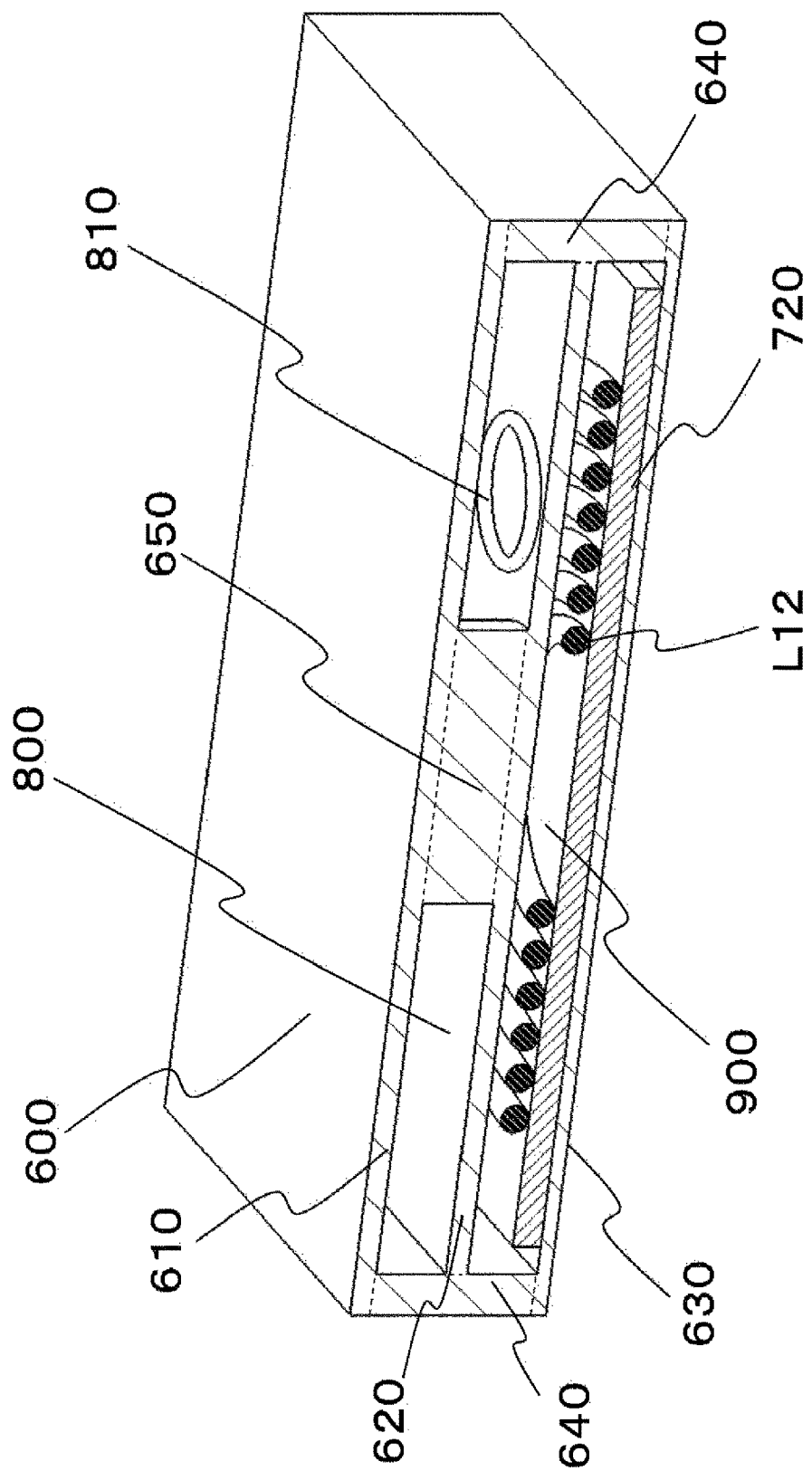
FIG. 15 is a schematic cross-sectional perspective view of the power receiving coil unit in the wireless power transmission device according to the ninth embodiment of the present invention which corresponds to the schematic cross-sectional perspective view of the power feeding coil unit according to the first embodiment of the present invention as shown in FIG. 3.

Next, wireless power transmission device S2 according to the ninth embodiment of the present invention will be described with reference to FIG. 14 and FIG. 15. FIG. 14 is a schematic view showing the wireless power transmission device according to the ninth embodiment of the present invention together with the electricity storage device. FIG. 15 is a schematic cross-sectional perspective view of the power receiving coil unit in the wireless power transmission device according to the ninth embodiment of the present invention which corresponds to the schematic cross-sectional perspective view of the power feeding coil unit according to the first embodiment of the present invention as shown in FIG. 3.

As shown in FIG. 14, wireless power transmission device S2 includes wireless power feeding device 101 and wireless power receiving device 201. In the present embodiment, an example will be described in which wireless power transmission device S2 is applied to a power feeding facility in a vehicle. That is, wireless power feeding device 101 is a power feeding facility mounted in the vehicle, and wireless power receiving apparatus 201 is a power receiving facility installed on the ground. Wireless power transmission device S2 according to the ninth embodiment of the present invention is reversed in the configuration of power feeding coil L11 of power feeding coil unit L1 installed on the ground side in the first embodiment and power receiving coil L12 of power receiving coil unit L2 mounted on the vehicle side in the first embodiment. Hereinafter, differences from the first embodiment will be mainly described.

Wireless power feeding device 101 is provided with inverter INV2 and power feeding coil unit L3. Inverter INV2 is connected to electricity storage device 251 mounted on the vehicle, and converts an input direct current power supplied from electricity storage device 251 to an alternating current power. Similar to inverter INV of the first embodiment, this inverter INV2 is constituted by a switching circuit in which a plurality of switching elements are bridge-connected. As the switching elements constituting this switching circuit, for example, elements such as MOS-FET and IGBT or the like can be listed. Electricity storage device 251 is not particularly restricted as long as it has a function of storing electric power, and for example, a secondary battery (lithium ion battery, lithium polymer battery, nickel-hydrogen battery, etc.), or a capacitive element (an electric double layer capacitor and etc.) can be listed. From the viewpoint of a high energy density, it is preferred to be a lithium ion battery.

Power feeding coil unit L3 is provided with power feeding coil L11 and magnetic shielding material 220, and these are packaged by housing 210. This power feeding coil unit L3 has the same configuration as power receiving coil unit L2 of the first embodiment except that it is provided with power feeding coil L11 instead of power receiving coil L12. That is, in the present embodiment, power feeding coil unit L3 is mounted on the lower part of an electric vehicle, and power feeding coil L11 transmits an alternating current power supplied by inverter INV to power receiving coil L12.

Wireless power receiving device 201 is provided with power receiving coil unit L4, rectifier 230, and charger 240. Rectifier 230 and charger 240 are the same configuration as the first embodiment except that they are mounted on the ground, thus, the descriptions are omitted.

As shown in FIG. 15, power receiving coil unit L4 is provided with housing 600, magnetic body 720, power receiving coil L12 and sensor 810. This power receiving coil unit L4 is provided with power receiving coil L12 instead of the power feeding coil L11 and housing 600 is provided with space for the power receiving coil 900 instead of space for power feeding coil 700. The power receiving coil 900 accommodates magnetic body 720 and power receiving coil L12. Except the above, power receiving coil unit L4 is configured in the same way as that of power feeding coil unit L1 of the first embodiment. That is, in the present embodiment, power receiving coil unit L4 is provided on the ground side; and space for the power receiving coil 900 is a space defined by bottom portion 630; side surface portion 640 and dividing plate 620 of housing 600; and power receiving coil L12 is installed on bottom portion 630 of housing 600 with magnetic body 720 interposed therebetween; and power receiving coil L12 receives an alternating current power supplied from power feeding coil L11 wirelessly.

With such a configuration, wireless power transmission device S2 wirelessly transmits electric power from power feeding coil L11 of wireless power feeding device 101 to power receiving coil L12 of wireless power receiving device 201 can be realized, and the alternating current power received from power receiving coil L12 can be rectified into a direct current power by rectifier 230, and this direct current power is charged to electricity storage device 260 disposed on the ground side by charger 240. That is, in the present embodiment, power transmission is performed from the vehicle side to the ground side. Electricity storage device 260 is not particularly limited as long as it has a function of storing electric power, and for example, a secondary battery (lithium ion battery, lithium polymer battery, nickel-hydrogen battery and etc.) and a capacitive element (electric double layer capacitor and etc.) can be listed.

As described above, in wireless power transmission device S2 according to the present embodiment, housing 600 is provided with dividing plate 620 and at least one pillar 650 for maintaining the internal space of space for sensor 800 in power feeding coil unit L4, wherein, dividing plate 620 divides housing 600 into space for power receiving coil 900 for accommodating power receiving coil L12 and space for sensor 800 for accommodating sensor 810 which is disposed vertically upper than space for the power receiving coil 900. Sensor 810 is disposed on dividing plate 620 without contacting with the upper inner surface portion of housing 600 in space for sensor 800. Therefore, space for sensor 800 is supported by pillar 650, thus, the load bearing performance of power feeding coil unit L4 can be ensured. Further, in space for sensor 800, since a gap can be ensured between the inner surface portion of housing 600 on the side where the vehicle runs on and sensor 810, the external stress such as a shock or a load when the vehicle runs on can be prevented from being directly transmitted to sensor 810. Therefore, it is possible to ensure the load bearing performance of power feeding coil unit L4 while suppressing the transmission of a stress to sensor 810 installed inside power feeding coil unit L4 when an external stress is applied.

Tenth Embodiment

Figure 16:
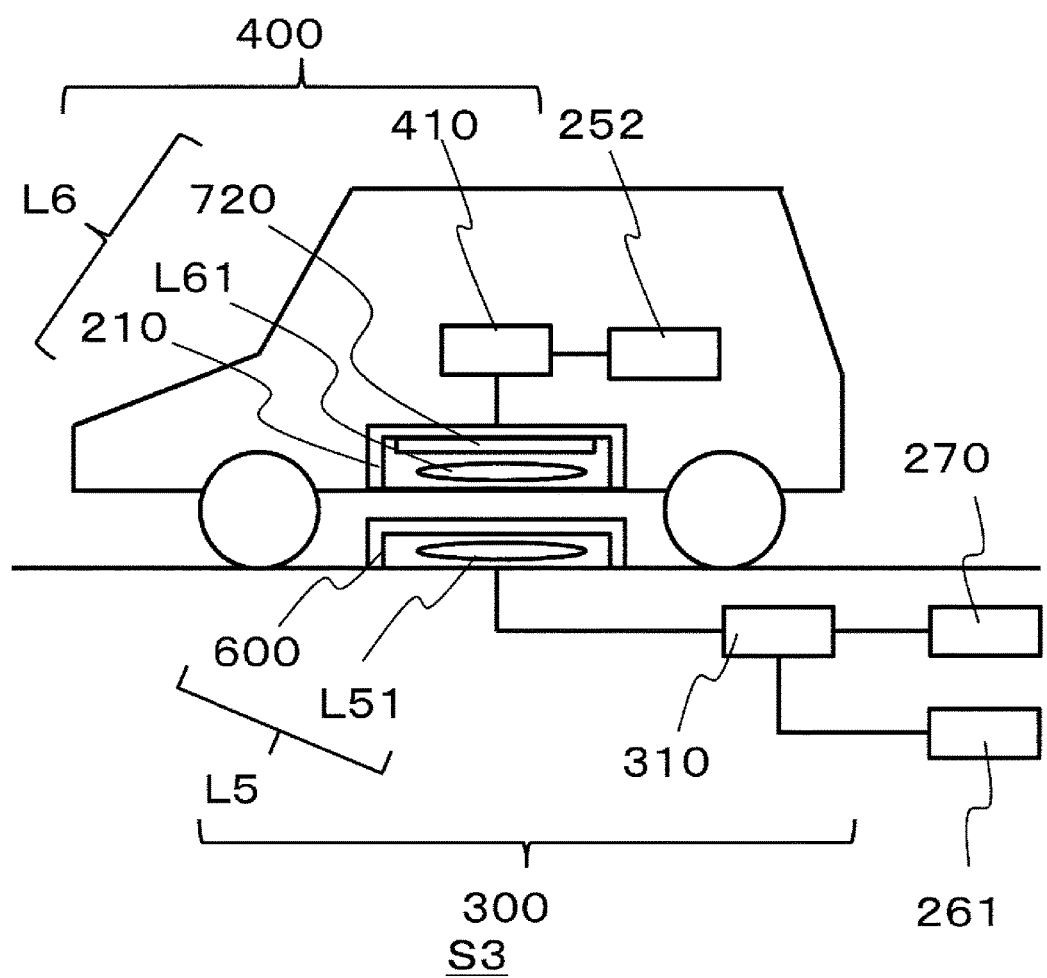
FIG. 16 is a schematic view showing the wireless power transmission device according to the tenth embodiment of the present invention together with the electricity storage device.
Figure 17:
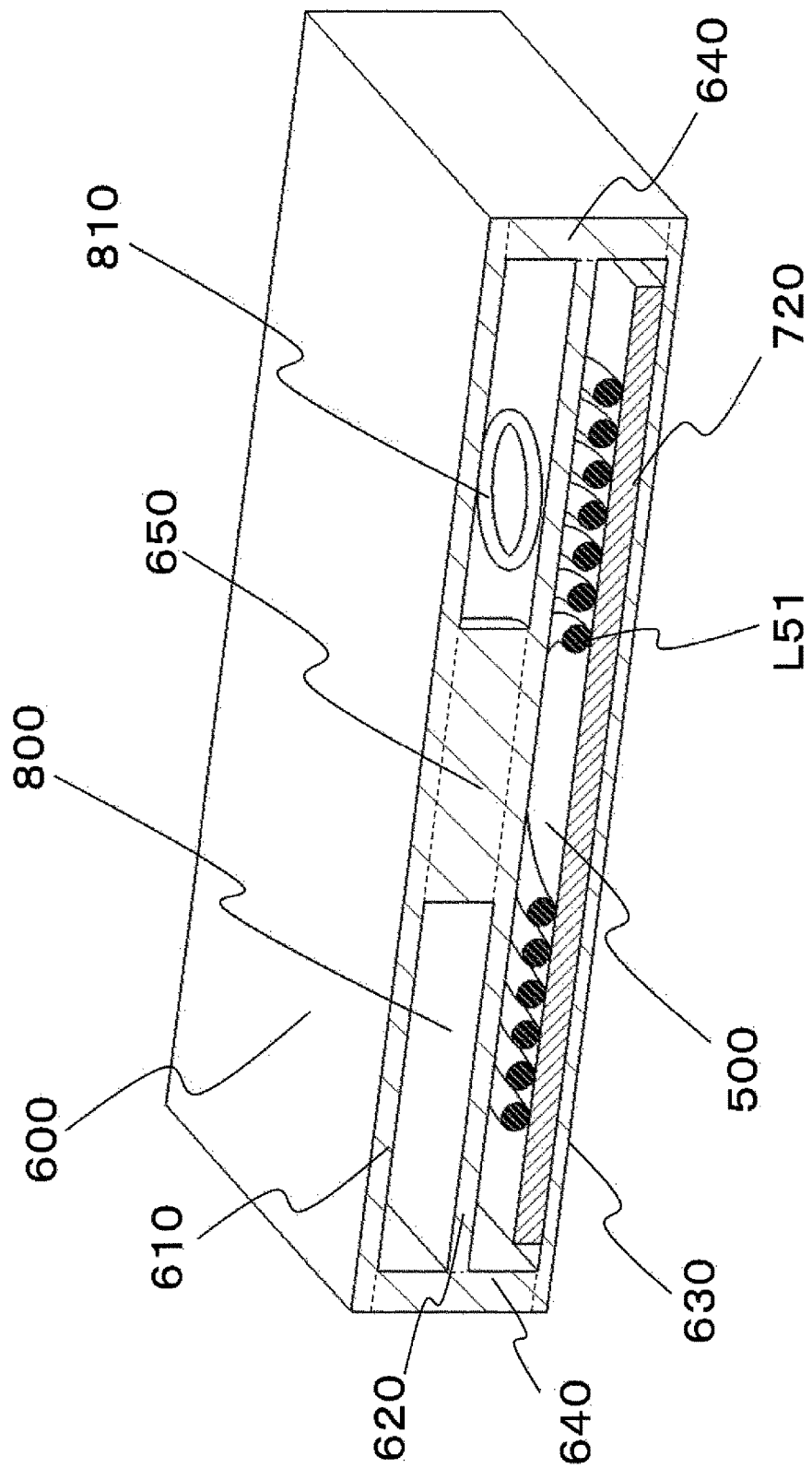
FIG. 17 is a schematic cross-sectional perspective view of the coil unit on the ground side in the wireless power transmission device according to the tenth embodiment of the present invention which corresponds to the schematic cross-sectional perspective view of the power feeding coil unit according to the first embodiment of the present invention as shown in FIG. 3.

Next, wireless power transmission device S3 according to the tenth embodiment of the present invention will be described with reference to FIG. 16 and FIG. 17. FIG. 16 is a schematic view showing the wireless power transmission device according to the tenth embodiment of the present invention together with the electricity storage device. FIG. 17 is a schematic cross-sectional perspective view of the coil unit on the ground side in the wireless power transmission device according to the tenth embodiment of the present invention which corresponds to the schematic cross-sectional perspective view of the power feeding coil unit according to the first embodiment of the present invention as shown in FIG. 3.

As shown in FIG. 16, wireless power transmission device S3 is provided with power supply device on the ground side 300 and power supply device on the vehicle side 400. In the present embodiment, power supply device on the ground side 300 is disposed on the ground and power supply device on the vehicle side 400 is mounted in a vehicle. Power feeding and receiving is performed between power supply device on the ground side 300 and power supply device on the vehicle side 400. Hereinafter, differences from the first embodiment will be mainly described.

Power supply device on the ground side 300 is provided with first power converter 310 and coil unit on the ground side L5. First power converter 310 is a bidirectional switching circuit. First power converter 310 is provided with a first operation mode and a second operation mode, wherein, in the first operation mode it is connected to a commercial power supply and converts an alternating current power supplied by the commercial power supply to an alternating current power for power feeding and outputs the alternating current power to coil unit on the ground side L5; and in the second operation mode it is connected to electricity storage device 261 provided on the ground side and converts an alternating current power supplied by coil unit on the ground side L5 to a direct current power for charge and outputs the direct current power to electricity storage device 261. Further, in the first operation mode, the operation may be an operation of being connected to electricity storage device 261 to convert a direct current power supplied from electricity storage device 261 into an alternating current power for power feeding instead of a commercial power supply.

As shown in FIG. 17, coil unit on the ground side L5 is provided with housing 600, magnetic body 720, coil on ground side L51 and sensor 810. This coil unit on the ground side L5 is provided with coil on the ground side L51 instead of power feeding coil L11 and housing 600 includes space for the coil on the ground side 500 for accommodating magnetic body 720 and coil on the ground side L51 instead of space for power feeding coil 700. Except the configuration mentioned above, coil unit on the ground side L5 is configured in the same way as power feeding coil unit L1 of the first embodiment. That is, in the present embodiment, coil unit on the ground side L5 is provided on the ground side, and space for the coil on the ground side 500 is a space defined by bottom portion 630, side surface portion 640 and dividing plate 620 of housing 600.

Coil on the ground side L51 functions as a power feeding part feeding an alternating current power supplied from first power converter 310 to coil on the vehicle side L61 wirelessly and a power receiving part receiving an alternating current power supplied from coil on the vehicle side L61 wirelessly. Specifically, when an alternating current power is supplied wirelessly, an alternating current flows in coil on the ground side L51 to generate an alternating current magnetic field by applying an alternating current voltage from first power converter 310 to coil on the ground side L51, and the electric power is transmitted to coil on the vehicle side L61 via the alternating current magnetic field. On the other hand, when an alternating current power is received wirelessly, an alternating current electromotive force is generated in coil on the ground side L51 by receiving an alternating current magnetic field generated by coil on the vehicle side L61, and an alternating current may flow in coil on the ground side L51 based on the alternating current electromotive force. That is, coil on the ground side L51 is a coil performing a feeding and receiving of alternating current power via the magnetic field. This coil on the ground side L51, like power feeding coil L11, is installed on bottom portion 630 of housing 600 in space for the coil on the ground side 500 with magnetic body 720 interposed therebetween. In other words, coil on the ground side L51 is installed on the inner surface portion of housing 600, which is opposite to the side where power transmission of coil unit on the ground side L5 is performed, in space for the coil on the ground side 500 with magnetic body 720 interposed therebetween.

Coil on the ground side L51 may be configured by continuously winding conductive wires, or it may be a plate-shaped coil formed by punching a plate material into a coil shape using press, or a coil which is formed by bending a thin plate material into a coil shape, or the like. Further, as the coil type of the coil configured by winding the conductive wires continuously, a spiral coil, a solenoidal coil, a coil made from a combination thereof, or the like can be listed. Further, as the coil type of the plate-shaped coil formed by punching a plate material into a coil shape using press and the coil formed by bending a thin plate material into a coil shape, a spiral coil, a coil made from a combination thereof, or the like can be listed. Furthermore, when coil on the ground side L51 is configured by continuously winding conductive wires into a planar shape, it can be disposed in space for the coil on the ground side 500 with the coil-winding axis direction being substantially parallel to the vertical direction, and it can be presented as various shapes such as a circle, a rectangle, a polygon, an ellipse, and etc. Further, as the material of the conductive wire when coil on the ground side L51 is configured by winding a conductive wire, copper, silver, gold, aluminum, or a metal wire including these as constituent components can be listed. From the viewpoint of weight reduction, aluminum wire, copper clad aluminum wire or the like may be used. From the viewpoint of achieving both weight reduction and electrical conductivity, a copper clad aluminum wire is preferable, in which copper is uniformly coated around the aluminum wire. The copper clad aluminum wire is preferably used as a litz wire in which a large number of the copper clad aluminum wires are bundled and twisted together. On the other hand, when coil on the ground side L51 is formed by punching a plate material into a coil shape using press or when coil on the ground side L51 is formed by bending a thin plate material into a coil shape, as the material of the plate material and the thin plate material, copper, silver, gold, aluminum, an alloy including these as constituent components, or the like can be listed. Herein, between coil on the ground side L51 and magnetic body 720, a bobbin (not shown) which plays a role of winding and fixing coil on the ground side L51 to the coil core and/or a role of insulating coil on the ground side L51 and magnetic body 720 can be provided. As the material of this bobbin, it is preferred to be an insulating resin. For example, acrylonitrile-butadiene-styrene copolymer (ABS), polybutylene terephthalate resin (PET), polyphenylene sulfide resin (PPS), fiber-reinforced plastic (FRP) or the like can be listed.

Power supply device on the vehicle side 400 is provided with coil unit on the vehicle side L6 and second power converter 410.

Coil unit on the vehicle side L6 is provided with coil on the vehicle side L61 and magnetic shielding material 220, which are packaged by housing 210. This coil unit on the vehicle side L6 is provided with coil on the vehicle side L61 instead of power receiving coil L12, except which it is configured in the same way as power receiving coil unit L2 of the first embodiment. That is, in the present embodiment, coil unit on the vehicle side L6 is mounted on the lower part of the vehicle.

Coil on the vehicle side L61 has a function of feeding an alternating current power supplied from second power converter 410 to coil on the ground side L51 wirelessly and a function of receiving an alternating current power supplied wirelessly from coil on the ground side L51. Specifically, when an alternating current power is supplied wirelessly, an alternating current flows in coil on the vehicle side L61 to generate an alternating current magnetic field by applying an alternating current voltage from second power converter 410 to coil on the vehicle side L61, and the electric power is transmitted to coil on the ground side L51 via the alternating current magnetic field. On the other hand, when an alternating current power is received wirelessly, an alternating current electromotive force is generated in coil on the vehicle side L61 by receiving an alternating current magnetic field generated by coil on the ground side L51, and an alternating current may flow in coil on the vehicle side L61 based on the alternating current electromotive force. That is, coil on the vehicle side L61 is a coil performing a feeding and receiving of alternating current power via the magnetic field. As coil on the vehicle side L61, a coil formed by continuously winding conductive wires, a coil formed by punching a plate material into a coil shape using press, or a coil formed by bending a thin plate material into a coil shape, or the like can be listed. As the material of the conductive wire when coil on the vehicle side L61 is configured by winding a conductive wire, copper, silver, gold, aluminum, or a metal wire including these as constituent components can be listed. From the viewpoint of weight reduction, aluminum wire, copper clad aluminum wire or the like may be used. From the viewpoint of achieving both weight reduction and electrical conductivity, a copper clad aluminum wire is preferable, in which copper is uniformly coated around the aluminum wire. The copper clad aluminum wire is preferably used as a litz wire in which a large number of the copper clad aluminum wires are bundled and twisted together. Further, when coil on the vehicle side L61 is formed by punching a plate material into a coil shape using press or when coil on the vehicle side L61 is formed by bending a thin plate material into a coil shape, as the material of the plate material and the thin plate material, copper, silver, gold, aluminum, an alloy including these as constituent components, or the like can be listed.

Second power converter 410 is a bidirectional switching circuit. Second power converter 410 is provided with a first operation mode and a second operation mode, wherein, in the first operation mode it converts an alternating current power supplied by coil on the vehicle side L61 to a direct current power for charging and outputs the direct current power to electricity storage device 252 mounted on the vehicle; and in the second operation mode it converts a direct current power supplied by electricity storage device 252 mounted on the vehicle to an alternating current power for power feeding and outputs the alternating current power to coil on the vehicle side L61. As electricity storage device 252 mounted on the vehicle, a secondary battery (lithium ion battery, lithium polymer battery, nickel-hydrogen battery and etc.) and a capacitive element (electric double layer capacitor and etc.) can be listed.

According to the configuration like this, wireless power transmission device S3 can be realized which can perform a feeding and receiving of electric power wirelessly between power supply device on the ground side 300 and power supply device on the vehicle side 400.

As described above, in wireless power transmission device S3 according to the present embodiment, housing 600 is provided with dividing plate 620 and at least one pillar 650 for maintaining the internal space of space for sensor 800 in power feeding coil unit L5, wherein, dividing plate 620 divides housing 600 into space for the coil on the ground side 500 for accommodating coil on the ground side L51 and space for sensor 800 for accommodating sensor 810 which is disposed vertically upper than space for the coil on the ground side 500. Sensor 810 is disposed on dividing plate 620 without contacting with the upper inner surface portion of housing 600 in space for sensor 800. Therefore, space for sensor 800 is supported by pillar 650, thus, the load bearing performance of coil unit on the ground side L5 can be ensured. Further, in space for sensor 800, since a gap can be ensured between the inner surface portion of housing 600 on the side where the vehicle runs on and sensor 810, the external stress such as a shock or a load when the vehicle runs on can be prevented from being directly transmitted to sensor 810. Therefore, it is possible to ensure the load bearing performance of coil unit on the ground side L5 while suppressing the transmission of a stress to sensor 810 installed inside coil unit on the ground side L5 when an external stress is applied.

In wireless power transmission device S3 according to the present embodiment, power supply device on the vehicle side 400 provided in the vehicle and power supply device on the ground side 300 performing a feeding and receiving of electric power between itself and power supply device on the vehicle side 400 wirelessly are provided. Power supply device on the ground side 300 is provided with coil unit on the ground side L5 comprising coil on the ground side L51 which is a coil performing a feeding and receiving of alternating current power via the magnetic field. Thereby, bidirectional wireless power transmission device S3 can be obtained with the load bearing performance of coil unit on the ground side L5 being ensured while suppressing the transmission of a stress to sensor 810 installed inside coil unit on the ground side L5 when an external stress is applied.

Hereinabove, the present invention is described based on the embodiments, but the present invention is not limited to the embodiments mentioned above, and various changes and variations can be performed.

For example, in the ninth embodiment and the tenth embodiment, the configurations of sensor 810 and housing 600 are described as being the same as in the first embodiment, but the present invention is not limited to this, and the configurations of sensor 810 and housing 600 of the second to seventh embodiments can also be used. Further, power receiving coil L12 of the ninth embodiment and coil on the ground side L51 of the tenth embodiment may use the characteristic configuration of power feeding coil L11 of the eighth embodiment.

Figure 18:
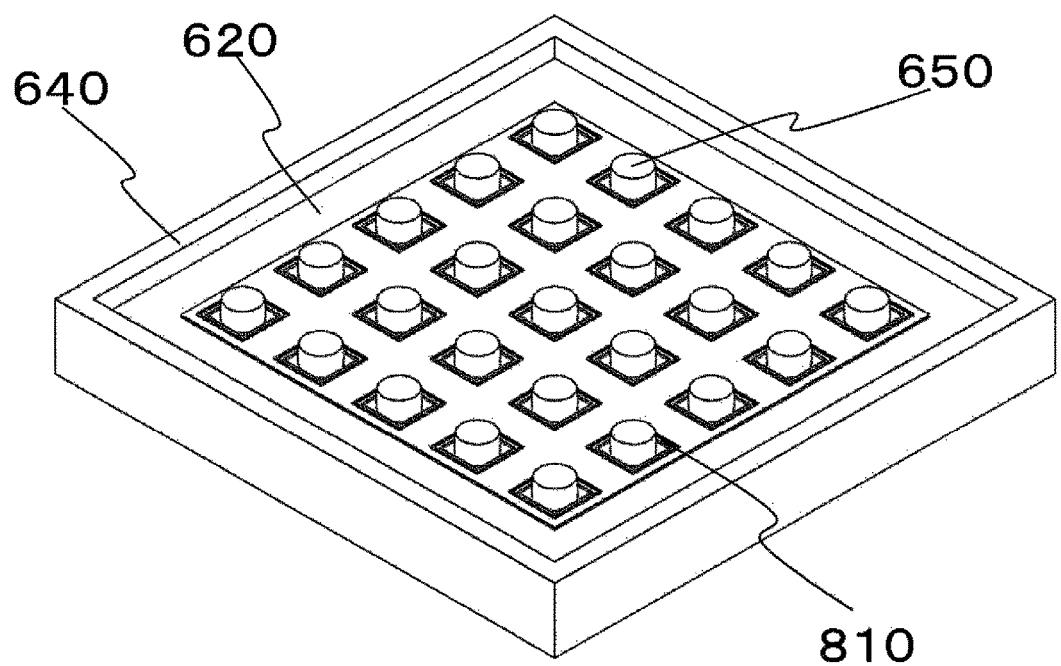
FIG. 18 is a schematic perspective view enlarging another example of the sensor and the space for the sensor of the power feeding coil unit from a vertically upper side.

Furthermore, in the fifth embodiment, it is described using an example in which a plurality of sensors 810 are constituted by ring-shaped coils, but it is not limited to this example, and the plurality of sensors 810 can also be constituted by printed coils. Herein, a case in which a plurality of sensors 810 are formed by print coils will be described with reference to FIG. 18. As shown in FIG. 18, a plurality of sensors 810 are formed by printing conductive patterns of printed coils on a substrate. Print coils constituting the plurality of sensors 810 are formed in a matrix form on a substrate, and in this example, a total of 25 printed coils of 5 rows and 5 columns are formed. On the substrate, holes penetrating in the vertical direction are formed in the center of each printed coil and a plurality of pillars 650 passes through the holes respectively to extend in the vertical direction. In the present example, the area where the object can be detected by sensors 810 can be broadened similar to the fifth embodiment.

The power feeding coil unit according to the present invention can be applied in a mobile object such as automatic guided vehicles besides electric vehicles.

DESCRIPTION OF REFERENCE NUMERALS

S1, S2, S3 . . . wireless power transmission device
100, 101 . . . wireless power feeding device
200, 201 . . . wireless power receiving device
210 . . . housing
220 . . . magnetic shielding material
230 . . . rectifier
240 . . . charger
250, 251, 252, 260, 261 . . . electricity storage device
270 . . . commercial power supply
300 . . . the power supply device on the ground side
310 . . . the first power converter
400 . . . the power supply device on the vehicle side
410 . . . the second power converter
INV, INV2 . . . inverter
L1, L3 . . . power feeding coil unit
L11 . . . power feeding coil
L2, L4 . . . power receiving coil unit
L12 . . . power receiving coil
L5 . . . coil unit on the ground side
L51 . . . coil on the ground side
L6 . . . coil unit on the vehicle side
L61 . . . coil on the vehicle side
500 . . . space for coil on the ground side
VG . . . power supply
600 . . . housing
610 . . . top portion
620 . . . dividing plate
630 . . . bottom portion
640 . . . side surface portion
650 . . . pillar
660 . . . projecting part
700 . . . space for the power feeding coil
720 . . . magnetic body
800 . . . space for sensor
810 . . . sensor
900 . . . space for the power receiving coil

What is claimed is:
1. A coil unit provided on a ground side, comprising
a coil,
at least one sensor for detecting an object existing above or around the coil unit, and
a housing for accommodating the coil and the at least one sensor,
wherein, the housing is provided with a dividing plate and at least one pillar, in which the dividing plate is for dividing the space into a space for coil and a space for sensor located vertically above the space for coil, and the space for coil is for accommodating the coil and the space for sensor is for accommodating the at least one sensor, and the at least one pillar is for maintaining the internal space of the space for sensor, and the at least one sensor is disposed on the dividing plate without contacting with an upper inner surface portion of the housing in the space for sensor.

2. The coil unit according to claim 1, wherein, the at least one sensor is a coil for detecting metal.

3. The coil unit according to claim 1, wherein, the at least one sensor has a hole penetrating in a vertical direction and the at least one pillar passes through the hole of the at least one sensor to extend vertically.

4. The coil unit according to claim 1, wherein, the at least one sensor comprises a plurality of sensors.

5. The coil unit according to claim 1, wherein, the at least one pillar comprises a plurality of pillars.

6. The coil unit according to claim 1, wherein, the housing has a projecting part extending vertically downward from the dividing plate in the space for coil.

7. The coil unit according to claim 6, wherein, the projecting part has a shape of a hollow tubular.

8. The coil unit according to claim 6, wherein, the coil is wound with the inner peripheral edge in contact with the projecting part.

9. The coil unit according to claim 1, wherein, the coil is a coil in which the feeding and receiving of an alternating current power is performed through a magnetic field.

10. A wireless power feeding device provided on the ground side, wherein, the wireless power feeding device comprises the coil unit according to claim 1.

11. A wireless power receiving device provided on the ground side, wherein, the wireless power receiving device comprises the coil unit according to claim 1.

12. A wireless power transmission device comprising a wireless power feeding device provided on a ground side and a wireless power receiving device mounted in a vehicle, wherein, the wireless power feeding device is the wireless power feeding device according to claim 10.

13. A wireless power transmission device comprising a wireless power feeding device mounted in a vehicle and a wireless power receiving device provided on a ground side, wherein, the wireless power receiving device is the wireless power receiving device according to claim 11.

14. A wireless power transmission device comprising a power supply device on a vehicle side mounted in the vehicle and a power supply device on the ground side in which the feeding and receiving of electric power is performed wirelessly between the power supply device on the vehicle side and the power supply device on the ground side, wherein, the power supply device on the ground side comprises the coil unit according to claim 9.

* * * * *